US012764312B2

(12) United States Patent
Zhang et al.

(10) Patent No.: US 12,764,312 B2
(45) Date of Patent: Oct. 13, 2026

(54) AUDIO AND VIDEO TRANSCODING APPARATUS AND METHOD, DEVICE, MEDIUM, AND PRODUCT

(71) Applicant: Tencent Technology (Shenzhen) Company Limited, Shenzhen (CN)

(72) Inventors: Zhidong Zhang, Shenzhen (CN); Liang Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/774,798

(22) Filed: Jul. 16, 2024

(65) Prior Publication Data

US 2024/0373047 A1 Nov. 7, 2024

Related U.S. Application Data

(63) Continuation of application No. PCT/CN2023/087966, filed on Apr. 13, 2023.

(30) Foreign Application Priority Data

May 13, 2022 (CN) ........................ 202210522292.X

(51) Int. Cl.
*H04N 19/40* (2014.01)
*G10L 19/16* (2013.01)

(52) U.S. Cl.
CPC ........... *H04N 19/40* (2014.11); *G10L 19/173* (2013.01)

(58) Field of Classification Search
CPC ........ H04N 19/40; G10L 19/173; G10L 19/16
See application file for complete search history.

(56) References Cited

U.S. PATENT DOCUMENTS

2014/0258558 A1 9/2014 Lemus
2015/0281752 A1* 10/2015 Van Veldhuisen ... H04N 21/233 725/116

(Continued)

FOREIGN PATENT DOCUMENTS

CN 110298896 A 10/2019
CN 110324629 A * 10/2019 ............. H04N 19/40
CN 110418144 A 11/2019

OTHER PUBLICATIONS

Tencent Technology, ISR, PCT/CN2023/087966, Jul. 27, 2023, 2 pgs.

*Primary Examiner* — Shahan Ur Rahaman
(74) *Attorney, Agent, or Firm* — Morgan, Lewis & Bockius LLP

(57) ABSTRACT

Provided are an audio and video transcoding method performed by a computer device. The method includes: obtaining first multimedia data in a first format; processing the first multimedia data in the first format into intermediate data through a first transcoding operation; processing the intermediate data into at least two pieces of second multimedia data in second formats through at least two second transcoding operations, the first transcoding operation and the at least two second transcoding operations being operations performed based on that a media bus provides a data communication channel; and outputting the at least two pieces of second multimedia data in the second formats.

20 Claims, 12 Drawing Sheets

(56) References Cited

U.S. PATENT DOCUMENTS

| | | | | |
|---|---|---|---|---|
| 2016/0041993 | A1* | 2/2016 | Maynard | G06F 16/116 707/809 |
| 2018/0176468 | A1* | 6/2018 | Wang | G09G 5/14 |
| 2020/0382803 | A1* | 12/2020 | Zhang | H04N 19/40 |
| 2022/0150514 | A1* | 5/2022 | Miller | H04N 21/8456 |
| 2022/0166604 | A1* | 5/2022 | Giladi | H04N 21/2347 |

* cited by examiner

AUDIO AND VIDEO TRANSCODING APPARATUS AND METHOD, DEVICE, MEDIUM, AND PRODUCT

CROSS-REFERENCE TO RELATED APPLICATIONS

This application is a continuation application of PCT Patent Application No. PCT/CN2023/087966, entitled "AUDIO AND VIDEO TRANSCODING APPARATUS AND METHOD, DEVICE, MEDIUM, AND PRODUCT" filed on Apr. 13, 2023, which claims priority to Chinese Patent Application No. 202210522292.X, entitled "AUDIO AND VIDEO TRANSCODING APPARATUS AND METHOD, DEVICE, MEDIUM, AND PRODUCT" and filed on May 13, 2022, both of which are incorporated by reference in their entirety.

FIELD OF THE TECHNOLOGY

This application relates to the field of audio and video processing, and in particular, to an audio and video transcoding apparatus and method, a device, a medium, and a product.

BACKGROUND OF THE DISCLOSURE

In the field of audio and video processing, to adapt to needs in different service scenarios, it is necessary to transcode audio and video data outputted by an audio and video media source, to obtain audio and video data that meets the need in the service scenario.

In the related art, audio and video transcoding is implemented in a serial pipeline manner. To be specific, in a transcoding system, after media data is decapsulated, a video processing procedure and an audio processing procedure are separately performed based on a media format, and a data processing process is implemented by a serial module in both the video processing procedure and the audio processing procedure.

However, there is a redundant processing operation in the foregoing solution when it is necessary to transcode media data in one format into media data in a plurality of target formats, resulting in a waste of a computing resource.

SUMMARY

Embodiments of this application provide an audio and video transcoding apparatus and method, a device, a medium, and a product, which can improve utilization of a computing resource during transcoding. Technical solutions are as follows:

According to one aspect, an audio and video transcoding method is provided, performed by a computer device, the method including:

- obtaining first multimedia data in a first format;
- processing the first multimedia data in the first format into intermediate data through a first transcoding operation;
- processing the intermediate data into at least two pieces of second multimedia data in second formats through at least two second transcoding operations, the first transcoding operation and the at least two second transcoding operations being operations performed based on that a media bus provides a data communication channel; and
- outputting the at least two pieces of second multimedia data in the second formats.

According to another aspect, a computer device is provided, including a processor and a memory, the memory having at least one segment of program code stored therein that, when loaded and executed by the processor, causing the computer device to implement the audio and video transcoding method according to any embodiment of this application.

According to another aspect, a non-transitory computer-readable storage medium is provided, having at least one segment of program code stored therein that, when loaded and executed by a processor of a computer device, causing the computer device to implement the audio and video transcoding method according to any embodiment of this application.

The technical solutions provided in this application include at least the following beneficial effects:

In an apparatus configured to transcode media data, a media bus is arranged, and first multimedia data in a first format is transcoded into at least two pieces of second multimedia data through data interaction between the media bus and at least one first transcoding module and at least two second transcoding modules. In the foregoing process, the media bus provides public communication for data, thereby implementing data multiplexing, so that when the first multimedia data in the first format is transcoded into the second multimedia data in a plurality of different formats, invoking of a same processing module can be reduced, thereby improving utilization of a data resource and a computing resource.

DESCRIPTION OF EMBODIMENTS

Transcoding is to convert an audio and video media signal from a format into another format. A transcoding procedure includes decoding an audio and video media source, and then selecting corresponding policies such as an audio and video standard, resolution, and a bit rate according to a need in a service scenario, to perform encoding and compression again. A transcoding technology facilitates data transmission in many scenarios. For example, when data transmission is performed through a network, there is a certain limitation on a transmission bandwidth. To reduce impact of a bandwidth limitation on audio and video data transmission, the transcoding technology may be used, to transcode audio and video data into data in a format with higher bandwidth efficiency for transmission. After receiving the audio and video data through the network, a terminal device may also use obtain audio and video data in different formats adapted to the terminal device by using the transcoding technology.

In embodiments of this application, a media bus is a trunk providing public communication when information is transferred between functional modules in a media data processing scenario, and is a public channel for transmitting information between functional modules that process media data. In the embodiments of this application, the media bus may be a virtual bus implemented by a computer program in software.

Figure 1:
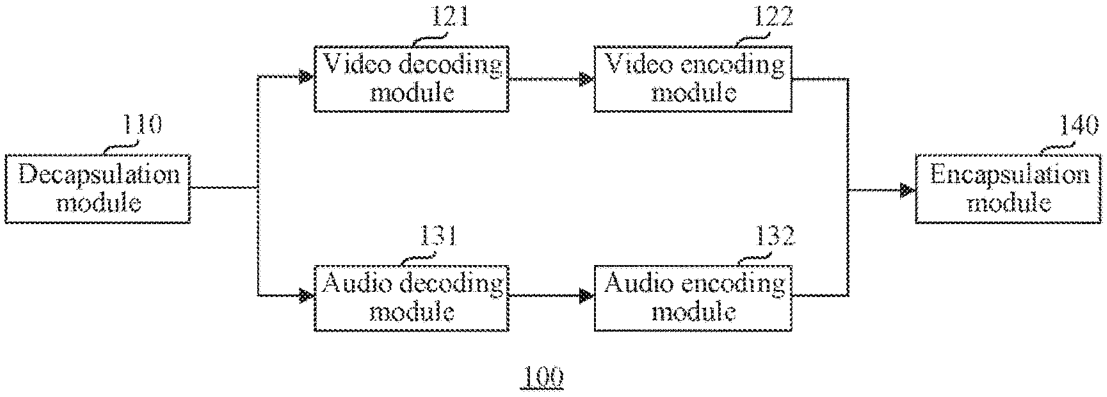
FIG. 1 is a schematic diagram of a transcoding system in the related art.

FIG. 1 is a schematic diagram of a transcoding system 100 in the related art. Media data is inputted into a decapsulation module 110 in the transcoding system 100 for decapsulation, and is decapsulated to obtain video data and audio data. The video data is transmitted to a video decoding module 121 for decoding, to obtain decoded video data, the video decoding module 121 transmits the decoded video data to a video encoding module 122, and the video encoding module 122 encodes the decoded video data, to obtain video data in a target format and transmit the video data in the target format to a format encapsulation module 140. The audio data is transmitted to an audio decoding module 131 for decoding, to obtain decoded audio data, the audio decoding module 131 transmits the decoded audio data to an audio encoding module 132, and the audio encoding module 132 encodes the decoded audio data, to obtain audio data in the target format and transmit the audio data in the target format to the format encapsulation module 140. The encapsulation module 140 performs encapsulation based on the received video data in the target format and the received audio data in the target format, to output media data in the target format.

However, at least the following problems exist during implementing transcoding of media data by using the foregoing transcoding system.

a. When it is necessary to transcode media data in one format into media data in a plurality of target formats, because processing procedures in the foregoing transcoding system are serial, there are redundant processing operations such as operations related with the decapsulation module and the decoding module during data processing, resulting in a waste of a computing resource. b. To meet transcoding needs in different service scenarios, after the media data is decoded, a part of intermediate processing needs to be performed on the media data before the media data is inputted into the encoding module. If an intermediate processing module needs to be added between the decoding module and the encoding module, the decoding module and the encoding module need to be first decoupled, and then a serial intermediate processing module is added. In addition, there may be different intermediate processing operations due to needs for the media data in the different service scenarios. As a result, to meet intermediate processing needs in the different service scenarios, there is difficulty in changing a structure of the transcoding system, and complexity of the system in adapting to the different service scenarios is increased.

In the embodiments of this application, the media bus is arranged to provide public communication for transmission of media data between transcoding modules. In other words, each transcoding module obtains the media data from the media bus, and transmits processed media data to the media bus. In the foregoing process, the media bus provides public communication for data, thereby implementing data multiplexing, so that when the first multimedia data in the first format is transcoded into the second multimedia data in a plurality of different formats, invoking of a same processing module can be reduced, thereby improving utilization of a data resource and a computing resource.

In addition, the transcoding modules are not directly connected, and perform data communication through the media bus. Therefore, for needs in different service scenarios, different transcoding modules may be mounted to the media bus, so that different transcoding systems can be used according to the different business scenarios, thereby improving utilization of a device processing resource and a storage resource.

For example, an application scenario in the embodiments of this application is exemplary described, and the method may be applied to the following scenarios.

1. The method is applied to a live streaming transcoding system. In a live streaming scenario, due to a difference between network conditions of different terminal devices and a difference in playback capabilities corresponding to hardware of the terminal devices, it is necessary to provide appropriate live streams according to different device needs, to avoid a live streaming anomaly caused by a case such as freezing occurring during the live streaming. Therefore, it is necessary to transcode a source live stream into a plurality of formats for output.
2. The method is applied to an on-demand transcoding system. Video on demand (VOD) is a video-on-demand system that plays a program according to needs of audience. In other words, video content tapped/clicked or selected by the terminal device is transmitted to the terminal device that makes a request. For example, a video-on-demand application is run in the terminal device. When receiving an on-demand operation for a target video, the video-on-demand application transmits a video-on-demand request to an on-demand server. The video-on-demand request includes a video identifier of the target video and a playback setting in the terminal device. The video-on-demand server reads a corresponding video file from a database according to the video identifier in the request, and inputs the video file into a video transcoding service. The video transcoding service performs transcoding based on a format requirement of the terminal device for video data, to obtain a transcoded video file. The on-demand server transmits the transcoded video file to the terminal device, and the terminal device plays the transcoded video file.

3. The method is applied to a player. The foregoing player is an application or a plug-in installed in the terminal for playing a video. For example, a local player reads a local file or receives a network stream, and transcodes the local file/network stream based on a hardware capability of the terminal device, to obtain a transcoded file/transcoded network stream and play the transcoded file/transcoded network stream.

For example, the foregoing three scenarios are merely described as examples. The audio and video transcoding method and apparatus provided in the embodiments of this application may also be applied to another scenario. This is not specifically limited herein.

Figure 2:
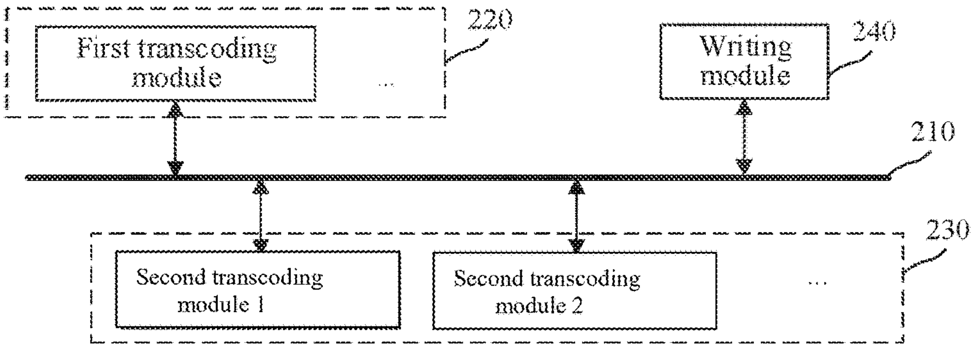
FIG. 2 is a schematic diagram of an audio and video transcoding apparatus according to an exemplary embodiment of this application.

For example, FIG. 2 is a schematic diagram of an audio and video transcoding apparatus according to an exemplary embodiment of this application. The apparatus includes a media bus 210, at least one first transcoding module 220, at least two second transcoding modules 230, and a writing module 240.

The at least one first transcoding module 220 is configured to perform data interaction with the media bus 210 and process first multimedia data in a first format into intermediate data through a first transcoding operation.

The foregoing first multimedia data is data that needs to be transcoded, and a data form of the first multimedia data includes at least one of audio and a video.

In some embodiments, the foregoing first multimedia data may be data read from a database, or data received from another terminal or server. The first transcoding operation is at least one of decapsulation and decoding.

The at least two second transcoding modules 230 are configured to perform data interaction with the media bus 210 and process the intermediate data into at least two pieces of second multimedia data in second formats through second transcoding operations. A different second transcoding module provides at least one different second transcoding operation. In other words, the at least two pieces of second multimedia data are obtained through transcoding through different second transcoding operations provided by the at least two second transcoding modules. The second transcoding operation includes at least one of encoding and encapsulation.

Different transcoding operations correspond to different transcoding modules. In other words, one transcoding module only processes one transcoding operation. For example, the first transcoding module is any one of a decapsulation module and a decoding module, and the second transcoding module is any one of an encapsulation module, an encoding module, and a preprocessing module.

In some embodiments, one transcoding module may provide a plurality of transcoding operations. For example, the first transcoding module provides a decapsulation operation and a decoding operation, and the second transcoding module provides an encoding operation and an encapsulation operation, or the second transcoding module provides a preprocessing operation, an encoding operation, and an encapsulation operation.

In some embodiments, one transcoding operation may correspond to a plurality of transcoding modules. In some embodiments, module arrangement may be performed for a same transcoding operation based on a data form of media data. For example, the transcoding module includes an audio processing module and a video processing module. In some embodiments, module arrangement may be performed for a same data processing operation based on an operation standard corresponding to a processing operation. For example, when arrangement of the encoding module is performed for video data, a first video encoding module configured to perform encoding based on an H.264 encoding standard and a second video encoding module configured to perform encoding based on an H.265 encoding standard may be arranged.

For example, the foregoing second format corresponding to the second multimedia data finally obtained through transcoding may be a target format determined based on a received media transcoding request. In some embodiments, the first format and the second format may be a same format or may be different formats. In some embodiments, a quantity of pieces of second multimedia data in the second format obtained through the foregoing transcoding process may be one or more. In other words, the first multimedia data in the first format may be indicated to be transcoded into a plurality of pieces of second multimedia data in second formats. This is not limited herein.

The writing module 240 is configured to perform data interaction with the second transcoding modules 230, to obtain the at least two pieces of second multimedia data in the second formats; and output the at least two pieces of second multimedia data in the second formats to a data receiver, the media bus 210 being configured to provide a data communication channel for the at least one first transcoding module 220 and the at least two second transcoding modules 230.

In some embodiments, a bus form of the media bus 210 includes at least one of a data bus, an address bus, and a control bus. The data bus is a communication trunk configured to transmit data, the address bus is a communication trunk configured to transmit a data address, and the control bus is a communication trunk configured to transmit a control signal.

In some embodiments, the writing module 240 may output the second multimedia data in the second formats into a storage area. In other words, the second multimedia data obtained through transcoding is stored. In some embodiments, the second multimedia data in the second formats may be transmitted to a connected network device.

The foregoing "first/second" is merely used for distinguishing media data before a transcoding procedure and media data after the transcoding procedure, and does not actually limit the format and the media data.

In conclusion, the audio and video transcoding apparatus provided in this application provides public communication for transmission between transcoding modules by using the media bus when the first multimedia data needs to be transcoded. In other words, each transcoding module obtains the media data from the media bus, and transmits processed media data to the media bus. In the foregoing process, the media bus provides public communication for data, thereby implementing data multiplexing, so that when the first multimedia data in the first format is transcoded into the second multimedia data in a plurality of different formats, processing of a same operation can be reduced, thereby improving utilization of a data resource and a computing resource.

Figure 3:
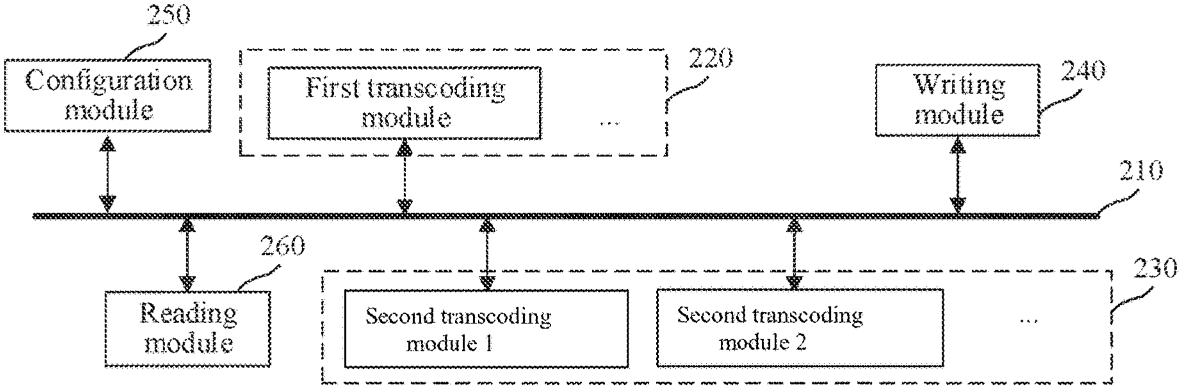
FIG. 3 is a schematic diagram of an audio and video transcoding apparatus according to another exemplary embodiment of this application.

In some exemplary embodiments, as shown in FIG. 3, the apparatus further includes a configuration module 250.

The configuration module 250 is configured to: obtain a configuration file; parse the configuration file, to obtain configuration information; and transmit the configuration information to the media bus 210.

The at least one first transcoding module 220 is further configured to: obtain the configuration information from the media bus 210; and provide the first transcoding operation for the first multimedia data based on the configuration information.

The at least two second transcoding modules are further configured to: obtain the configuration information from the media bus 210; and provide the second transcoding operations for the intermediate data based on the configuration information.

The foregoing configuration information includes format indication information for the second format. In other words, the configuration information indicates a media format obtained after the first multimedia data is transcoded.

In some embodiments, the foregoing configuration information may include at least one type of information such as an encoding format, an encapsulation format, and attribute information that correspond to the second format; and/or the configuration information may include a transcoding module (including the first transcoding module 220 and the second transcoding module 230) that needs to be enabled. For example, when a transcoding manner corresponding to the transcoding module is preset, a format requirement corresponding to the second format is implicitly indicated through the transcoding manner corresponding to the transcoding module.

In some embodiments, the foregoing configuration file may be preconfigured, or may be generated in real time based on the media transcoding request, or may be determined from a candidate configuration file based on the transcoding request.

For example, when the foregoing configuration file is generated in real time based on the media transcoding request, after the media transcoding request is received, the configuration information is determined based on the second format indicated by the media transcoding request, to generate the configuration file.

In some embodiments, the foregoing process of generating the configuration file based on the media transcoding request may be implemented by a network device completing a transcoding process. For example, a gateway service in a server receives the media transcoding request transmitted by a terminal device, and the gateway service generates the corresponding configuration file based on the media transcoding request and transmits the configuration file to a media transcoding service. The foregoing process of generating the configuration file based on the media transcoding request may alternatively be implemented by another network device. For example, a terminal device generates the configuration file based on the media transcoding request after receiving an operation indicating the media transcoding request, and then transmits the configuration file to a server. For example, when the foregoing configuration file is determined from the candidate configuration file based on the transcoding request, there is a format identifier of the to-be-transcoded second format corresponding to the received media transcoding request. The corresponding configuration file is obtained from the storage area based on the format identifier. The foregoing configuration file in the storage area is a preconfigured candidate file, and because a candidate format for media transcoding may be exhausted, efficiency of responding to the media transcoding request can be improved by using the preconfigured candidate file.

In some embodiments, the first transcoding module 220 and the second transcoding module 230 query the media bus 210. In response to the configuration information queried from the media bus 210, the configuration information is obtained, and whether the media data needs to be read from the media bus 210 is determined based on the configuration information. If it is determined that the data needs to be read from the media bus 210, a type of media data to be read from the media bus 210 is determined based on the configuration information. In other words, a data processing situation of each transcoding module in the entire transcoding system is configured by using the configuration information.

In some exemplary embodiments, the apparatus further includes: a reading module 260, configured to receive the first multimedia data in the first format from a first input source; and transmit the first multimedia data in the first format to the first transcoding module 220. In some other embodiments, the foregoing reading module 260 may be further connected to the media bus 210. In other words, the reading module transmits the first multimedia data in the first format to the media bus, and the first transcoding module reads the first multimedia data in the first format from the media bus.

In the method provided in this embodiment, the first transcoding module and the second transcoding module are adaptively selected based on the configuration information for corresponding transcoding, and perform interaction through the media bus, avoiding a resource waste when different transcoding tasks all require serial processing by using all transcoding modules and improving transcoding efficiency.

Figure 4:
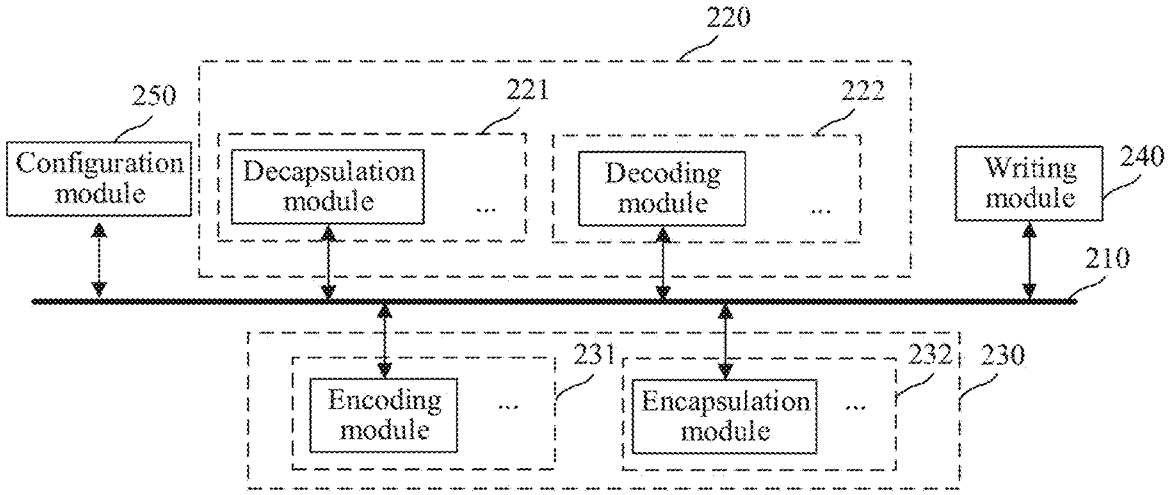
FIG. 4 is a schematic diagram of an audio and video transcoding apparatus according to another exemplary embodiment of this application.

In some exemplary embodiments, as shown in FIG. 4, the first transcoding module 220 includes at least one of a decapsulation module 221 and a decoding module 222.

The decapsulation module 221 is configured to provide a decapsulation operation for the first multimedia data when the configuration information indicates to decapsulate the first multimedia data; and the decoding module 222 is configured to provide a decoding operation for the first multimedia data when the configuration information indicates to decode the first multimedia data. For example, when the data form of the first multimedia data is audio data or video data, the first transcoding module 220 may be the decapsulation module 221 or the decoding module 222, or may be a combination of the decapsulation module 221 and the decoding module 222. When the data form of the first multimedia data is audio and video data, the first transcoding module 220 is the combination of the decapsulation module 221 and the decoding module 222.

In some exemplary embodiments, the second transcoding module 230 includes at least one of an encoding module 231 and an encapsulation module 232, where the encoding module 231 is configured to provide an encoding operation for the intermediate data when the configuration information indicates to encode the intermediate data; and the encapsulation module 232 is configured to provide an encapsulation operation for the intermediate data when the configuration information indicates to encapsulate the intermediate data. For example, when the data form of the first multimedia data is the audio data or the video data, the second transcoding module 230 may be the encapsulation module 232 or the encoding module 231, or may be a combination of the encapsulation module 232 and the encoding module 231. When the data form of the first multimedia data is the audio and video data, the second transcoding module 230 may be the combination of the encapsulation module 232 and the encoding module 231.

In some exemplary embodiments, the at least two second transcoding modules 230 include at least two encoding modules 231, where the at least two pieces of second multimedia data in the second formats are obtained through encoding in encoding formats respectively corresponding to the at least two encoding modules 231, and a different encoding module 231 corresponds to a different encoding format; and the encoding module 231 is configured to encode the intermediate data based on the encoding format corresponding to the encoding module 231 when the configuration information indicates to encode the intermediate data.

In some exemplary embodiments, the second transcoding module 230 further includes a preprocessing module 233; and the preprocessing module 233 is configured to provide a preprocessing operation for the intermediate data when the configuration information indicates to preprocess the intermediate data.

In some exemplary embodiments, the at least two second transcoding modules 230 include at least two preprocessing modules 233, where the at least two pieces of second multimedia data in the second formats are obtained through encoding in preprocessing manners respectively corresponding to the at least two preprocessing modules 233, and a different preprocessing module 233 corresponds to a different preprocessing manner; and the preprocessing module 233 is configured to preprocess the intermediate data in the preprocessing manner corresponding to the preprocessing module when the configuration information indicates to preprocess the intermediate data.

In the method provided in this embodiment, the decapsulation operation or the decoding operation is selectively performed on the first multimedia data based on the configuration information, and the encapsulation operation or the encoding operation or the preprocessing operation is selectively performed on the intermediate data based on the configuration information, avoiding redundant processing of data and improving data processing efficiency.

Figure 5:
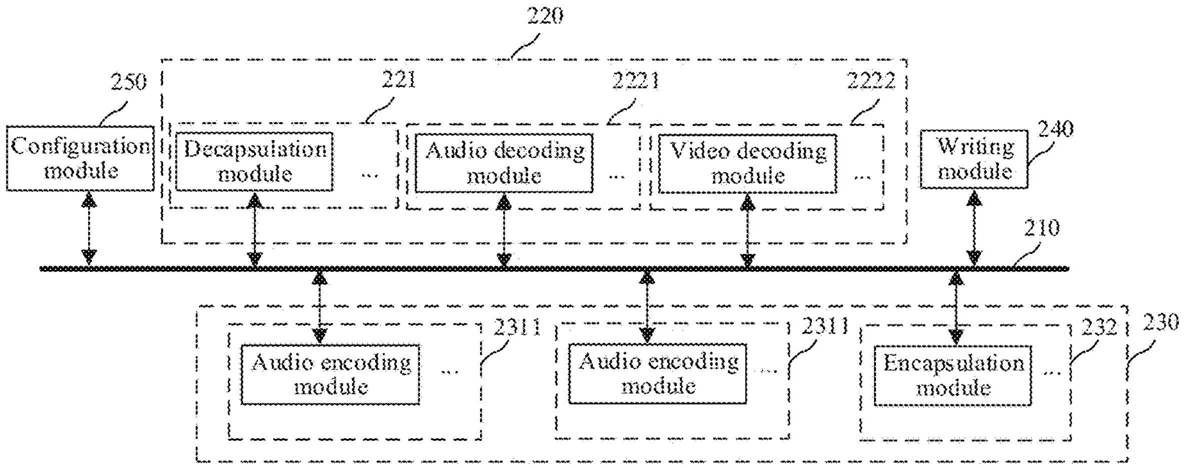
FIG. 5 is a schematic diagram of an audio and video transcoding apparatus according to another exemplary embodiment of this application.

In some exemplary embodiments, as shown in FIG. 5, when the first multimedia data is the audio and video data, the first transcoding module 220 includes the decapsulation module 221; and the first transcoding module 220 further includes at least one of an audio decoding module 2221 and a video decoding module 2222, where the decapsulation module 221 is configured to: decapsulate the first multimedia data in the first format, to obtain decapsulated audio data and decapsulated video data as intermediate data obtained through encapsulation; and transmit the decapsulated audio data and the decapsulated video data to the media bus 210;

the audio decoding module 2221 is configured to: obtain the decapsulated audio data from the media bus 210 when the configuration information indicates to decode the decapsulated audio data; decode the decapsulated audio data, to obtain decoded audio data; and transmit, to the media bus, the decoded audio data as intermediate data obtained through decoding; and the video decoding module 2222 is configured to: obtain the decapsulated video data from the media bus 210 when the configuration information indicates to decode the decapsulated video data; decode the decapsulated video data, to obtain decoded video data; and transmit, to the media bus 210, the decoded video data as intermediate data obtained through decoding.

In some exemplary embodiments, the second transcoding module 230 includes the encapsulation module 232; and the second transcoding module 230 further includes at least one of an audio encoding module 2311 and a video encoding module 2312, where the audio encoding module 2311 is configured to: obtain the decoded audio data from the media bus 210 when the configuration information indicates to encode the decoded audio data; encode the decoded audio data, to obtain encoded audio data; and transmit the encoded audio data to the media bus 210; the video encoding module 2312 is configured to: obtain the decoded video data from the media bus 210 when the configuration information indicates to encode the decoded video data; encode the decoded video data, to obtain encoded video data; and transmit the encoded video data to the media bus 210; and the encapsulation module 232 is configured to: obtain the encoded audio data and the encoded video data from the media bus when the configuration information indicates to encapsulate the encoded audio data and the encoded video data; and encapsulate the encoded audio data and the encoded video data, to obtain the second multimedia data in the second format.

In some exemplary embodiments, the second transcoding module 230 includes at least two video encoding modules 2312, and a different video encoding module 2312 corresponds to a different video encoding format, where the video encoding module 2312 is configured to: encode, when the configuration information indicates to encode the decoded video data, the decoded video data based on the video encoding format corresponding to the video encoding module, to obtain the encoded video data; and transmit the encoded video data to the media bus 210; and the encapsulation module 232 is further configured to: obtain the encoded audio data and at least two pieces of encoded video data from the media bus 210 when the configuration information indicates to encapsulate the encoded audio data and the encoded video data, where the at least two pieces of encoded video data are encoded video data transmitted by the at least two video encoding modules 2312; and encapsulate the at least two pieces of encoded video data separately with the encoded audio data, to obtain the at least two pieces of second multimedia data in the second formats.

Figure 6:
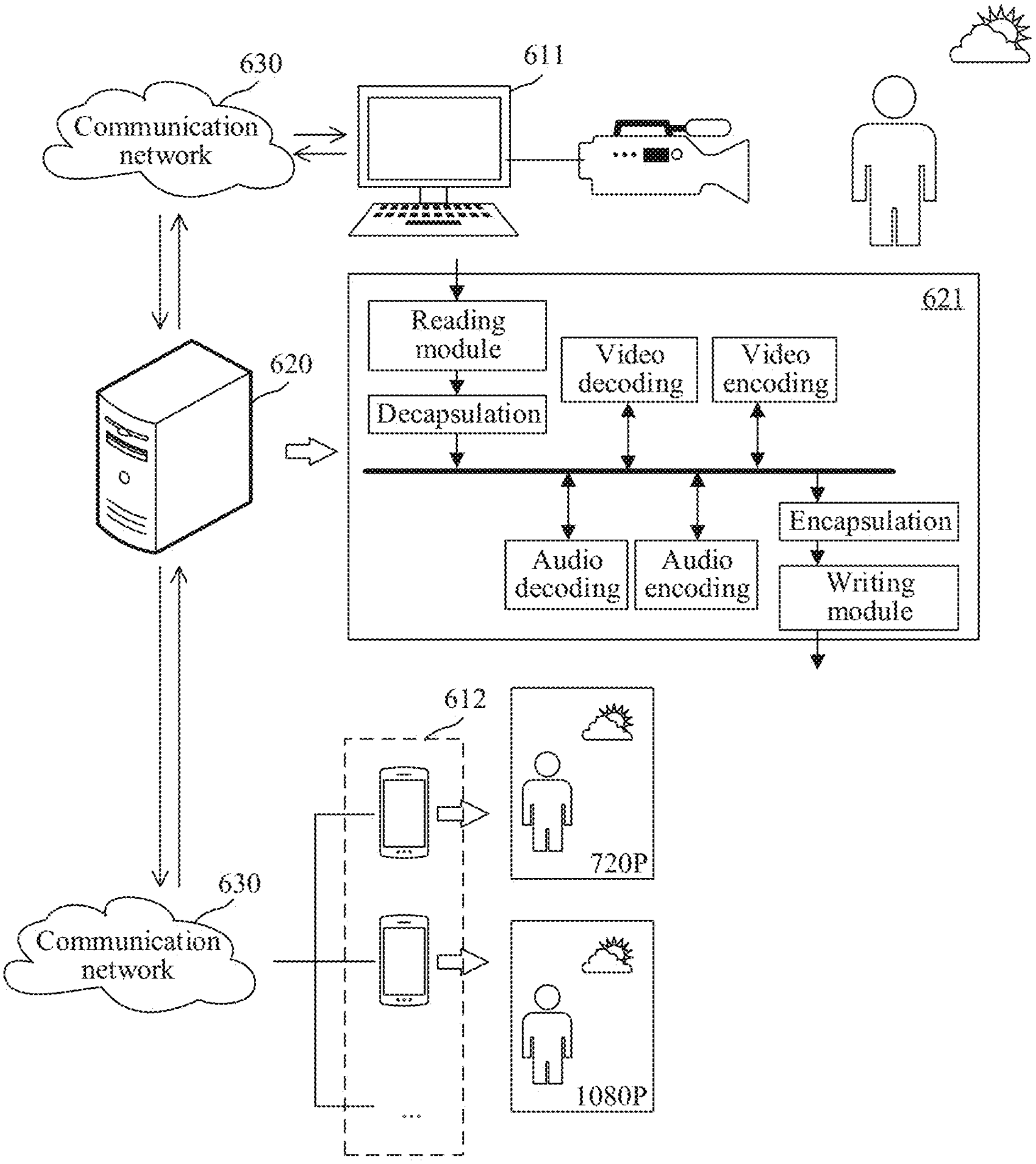
FIG. 6 is a schematic diagram of an application scenario according to an exemplary embodiment of this application.

In some embodiments, the audio and video transcoding method provided in this embodiment of this application may be applied to the terminal device, or may be applied to the server, or may be applied to a joint system of the terminal device and the server. For example, the method is implemented jointly by the terminal device and the server. FIG. 6 is a schematic diagram of an application scenario according to an exemplary embodiment of this application. A computer system 600 in the application scenario includes: a terminal device (including a first terminal 611 and a second terminal 612), a server 620, and a communication network 630.

The terminal device includes devices in a plurality of forms such as a mobile phone, a tablet computer, a desktop computer, a portable laptop computer, a high-density digital video disc (DVD) player, a display control integrated device, a smart home appliance, an in-vehicle terminal, and an aircraft. A target application is run in the terminal device, and the target application can provide an audio and video transcoding function. In some embodiments, the target application may be conventional application software, or may be cloud application software, or may be implemented as a program or an application module/a plug-in in a host application program, or may be a specified web page platform. This is not limited herein. In some embodiments, the foregoing target application may be any one of a video playback application, an audio playback application, a live streaming application, a cloud gaming application, an in-vehicle video application, and the like. This is not specifically limited herein.

The server 620 is configured to provide a back-end service to the terminal device. For example, the server 620 transmits media data to the terminal device, and after the terminal device receives the media data and receives a format conversion operation for the media data, the target application invokes a video transcoding component to transcode the media data, to transcode the media data in an original format into media data in a target format indicated by the format conversion operation. In some embodiments, the target application may store the media data obtained through transcoding or play the media data through a player.

For example, the terminal device and the server 620 are connected through the communication network 630. The foregoing communication network 630 may be a wired network, or may be a wireless network. This is not limited herein.

In some embodiments, a transcoding process of the media data may also be implemented in the server 620. In other words, the server 620 performs one-input multi-format output transcoding. In an example, that the audio and video transcoding method is applied to a video transmission and processing process in a live streaming scenario is used for exemplary description. Referring to FIG. 4, the first terminal 611 is an anchor terminal, and the first terminal 611 obtains a live streaming picture through acquisition by a camera, or a picture displayed by the first terminal 611 is captured as a live streaming picture. A video stream corresponding to the live streaming picture is encoded and decapsulated as a data packet, and the data packet is transmitted to the server 620. The server 620 inputs the data packet into a live streaming transcoding service 621, to output transcoded video streams in a plurality of video formats, and video data in different video formats are transmitted to different second terminals 612. The second terminal 612 is an audience terminal, and a live streaming application is run in the second terminal 612. A video format of the live streaming picture may be set in the live streaming application, and the server 620 pushes a corresponding transcoded video stream to the second terminal 612 based on a setting situation. The live streaming application of the second terminal 612 displays the live streaming picture based on the received transcoded video stream. The first terminal 611 and the server 620, as well as the second terminal 612 and the server, are connected through the communication network 630. The server 620 may be an independent physical server, or may be a server cluster or a distributed system formed by a plurality of physical servers, or may be a cloud server that provides a cloud service, a cloud database, cloud computing, a cloud function, cloud storage, a network service, cloud communication, a middleware service, a domain name service, a security service, a content delivery network (CDN), and a basic cloud computing service such as big data and an artificial intelligence platform. In some embodiments, the foregoing server 620 may be further implemented as a node in a blockchain system.

Figure 7:
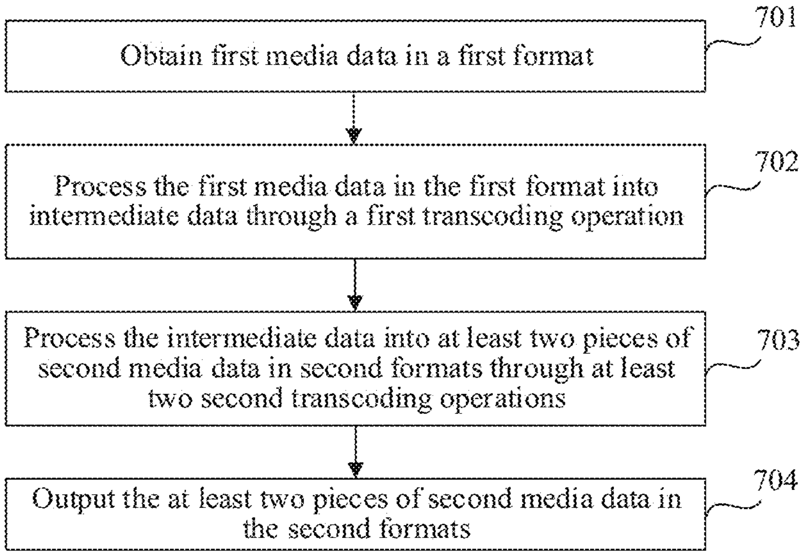
FIG. 7 is a flowchart of an audio and video transcoding method according to an exemplary embodiment of this application.

FIG. 7 is an audio and video transcoding method shown in an embodiment of this application. In this embodiment of this application, an example in which the method is applied to the server shown in FIG. 6 is used for description. The method may alternatively be implemented by a terminal device. This is not limited herein. The method includes the following operations.

Operation 701: Obtain first multimedia data in a first format.

The foregoing first multimedia data is data that needs to be transcoded. In other words, the first format is a media format before transcoding. A data form of the first multimedia data includes at least one of audio and a video.

In some embodiments, the foregoing first multimedia data may be data read from a database, or data received from another terminal or server.

For example, format information of the media data includes at least one type of information such as an encoding format, an encapsulation format, and attribute information that correspond to the media data. In some embodiments, when the media data is video data, the encoding format corresponding to the video data includes H.264, H.265, and the like; and when the media data is audio data, the encoding format corresponding to the audio data includes an advanced audio coding (AAC), a voice encoding format (Opus), and the like. In some embodiments, when the media data is the video data, the encapsulation format corresponding to the video data includes a moving picture experts group (MPEG/MPG) format, a digital audio tape (DAT) format, a moving picture experts group 4 (MP4) format, a flash video (FLV) format, a transport stream (TS) format, and the like; and when the media data is the audio data, the encapsulation format corresponding to the audio data includes a moving picture experts group audio layer III (MP3) format, an ogg (ogg vorbis) format, a windows media audio (WMA) format, and the like.

In some embodiments, when the media data is the video data, the attribute information corresponding to the video data includes information such as a bit rate, resolution, a frame rate, a picture size, a color space, a group of pictures (GOP) length, and an encoding level; and when the media data is the audio data, the attribute information corresponding to the audio data includes information such as a bit rate, a volume, a sampling rate, and sampling resolution.

Operation 702: Process the first multimedia data in the first format into intermediate data through a first transcoding operation.

The first transcoding operation includes at least one of decapsulation and decoding. In some embodiments, the first transcoding operation is an operation performed based on that a media bus provides a data communication channel. In some embodiments, data interaction is performed between the media bus and a first transcoding module, so that the first transcoding operation is performed by the first transcoding module, to process the first multimedia data in the first format into the intermediate data. In other words, the first multimedia data in the first format is processed into the intermediate data through the data interaction between the media bus and at least one first transcoding module.

The media bus is configured to transmit the media data during transcoding. In other words, when communication is performed between the transcoding modules, the media bus provides a data transmission channel for the transcoding modules. In this embodiment of this application, the media bus is connected to a plurality of transcoding modules, and the foregoing at least one first transcoding module is a module in the plurality of transcoding modules connected to the media bus. In some embodiments, a configuration file is obtained, so that the at least one first transcoding module that needs to perform the first transcoding operation may be determined from the transcoding modules connected to the media bus. For example, the configuration file is parsed, so that configuration information configured for indicating to provide a processing operation for the first multimedia data can be obtained. Based on the configuration information, the data interaction between the media bus and the at least one first transcoding module is controlled to be performed, to transcode the first multimedia data in the first format into the intermediate data.

In some embodiments, the transcoding module is configured to provide at least one data processing operation of decapsulation, decoding, encoding, encapsulation, and preprocessing for the media data. The first transcoding module is configured to provide at least one data processing operation of decapsulation and decoding.

Encapsulation means that the media data is encapsulated into a particular media file based on a specified encapsulation format. For example, audio data, video data, and subtitle data are encapsulated together into a media file. Decapsulation is a reverse process of encapsulation. For example, the media file is decapsulated into the audio data, the video data, and the subtitle data. Encoding is converting the media data into a file in a specified format through a compression technology, while decoding is a reverse process of encoding. Encoding and decoding include lossy encoding and decoding and lossless encoding and decoding.

For example, the first multimedia data is audio and video data. When the transcoding module includes a decapsulation module, the first multimedia data in the first format is decapsulated, to obtain decapsulated audio data and decapsulated video data as intermediate data obtained through encapsulation; and the decapsulated audio data and the decapsulated video data are transmitted to the media bus. When the transcoding module includes an audio decoding module, the decapsulated audio data is obtained from the media bus; the decapsulated audio data is decoded, to obtain decoded audio data; and the decoded audio data as intermediate data obtained through decoding is transmitted to the media bus. When the transcoding module includes a video decoding module, the decapsulated video data is obtained from the media bus; the decapsulated video data is decoded, to obtain decoded video data; and the decoded video data as intermediate data obtained through decoding is transmitted to the media bus.

When the transcoding module includes an audio encoding module, the decoded audio data is obtained from the media bus; the decoded audio data is encoded, to obtain encoded audio data; and the encoded audio data is transmitted to the media bus. When the transcoding module includes an encapsulation module, the encoded audio data and encoded video data are obtained from the media bus; and the encoded audio data and the encoded video data are encapsulated, to obtain second multimedia data in second formats.

When the transcoding module is an audio preprocessing module, the decoded audio data as the intermediate data is obtained from the media bus, and the intermediate data is preprocessed in a preprocessing manner corresponding to the audio preprocessing module. When the transcoding module is a video preprocessing module, the decoded video data as the intermediate data is obtained from the media bus, and the intermediate data is preprocessed in a preprocessing manner corresponding to the video preprocessing module.

In some embodiments, different data processing operations correspond to different transcoding modules. In other words, one transcoding module only processes one data processing operation. For example, if the transcoding module may include the decapsulation module, an encapsulation module, a decoding module, an encoding module, and a preprocessing module, the first transcoding module includes at least one of the decapsulation module and the decoding module. In some embodiments, one data processing operation may correspond to a plurality of transcoding modules. In some embodiments, module arrangement may be performed for a same data processing operation based on a data form of media data. For example, the transcoding module includes an audio processing module and a video processing module.

In some embodiments, a bus form of the media bus includes at least one of a data bus, an address bus, and a control bus.

In some embodiments, when the foregoing media bus is implemented as the data bus, the transcoding module obtains the media data from the media bus, and then transmits processed media data to the media bus. Alternatively, the transcoding module obtains a pointer corresponding to the media data from the media bus, obtains the corresponding media data based on the pointer, and then transmits processed media data to the media bus. In some embodiments, data transmitted through the data bus may be the media data itself, or may be the pointer pointing to the media data. In some embodiments, when the foregoing media bus is implemented as the address bus, the transcoding module obtains an address of the media data from the media bus, obtains the corresponding media data based on the address from a data storage area storing the media data, and then transmits processed media data to the corresponding data storage area and transmits the corresponding address to the media bus. In some embodiments, a data structure used in the foregoing data storage area may be any one of a queue, a stack, a linked list, and a hash table.

Figure 8:
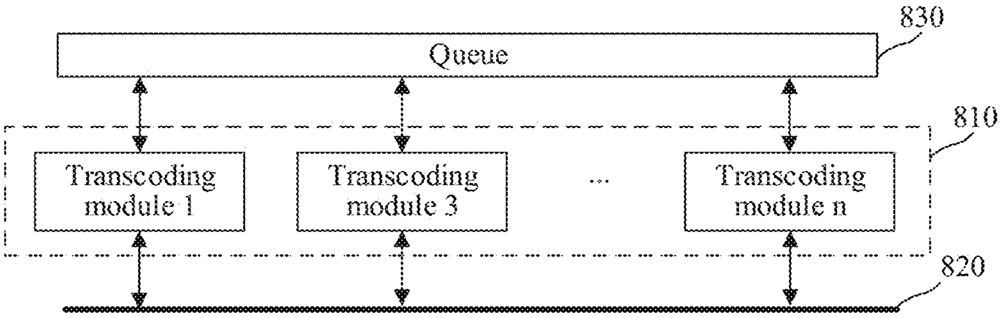
FIG. 8 is a schematic diagram of a transcoding architecture according to an exemplary embodiment of this application.

For example, the media data is stored through the queue. FIG. 8 shows a transcoding architecture according to an exemplary embodiment of this application. N transcoding modules 810, a media bus 820, and a queue 830 are included. The n transcoding modules 810 are mounted to the media bus 820. The media bus 820 and the transcoding module 810 perform interaction of a storage address corresponding to media data. After obtaining the storage address, the transcoding module 810 queries an address of queue head data of the queue 830. If the address matches the storage address obtained from the media bus 820, the media data is obtained from the queue 830. After completing data processing, the transcoding module 810 inserts processed media data into the queue 830 and transmits the corresponding storage address to the media bus 820. For example, the transcoding module 810 in the figure may be a first transcoding module, or may be a second transcoding module. In some embodiments, a same queue or different queues may be used between the first transcoding module and the second transcoding module to buffer data.

In some embodiments, to ensure accuracy of the storage address obtained by the transcoding module, the queue storing the media data may be divided based on a processing situation of the media data. In an example, data obtained through processing by different transcoding modules is stored in different queues. The transcoding module may query the data in the media bus based on whether an address range corresponding to the storage address in the media bus satisfies a reading condition, in other words, whether a queue indicated by the storage address is a queue in which the transcoding module performs data reading. For example, decapsulated data obtained through decapsulation is stored in a queue A, decoded data obtained through decoding is stored in a queue B, and encoded data obtained through encoding is stored in a queue C.

In some embodiments, when the foregoing media bus is implemented as the control bus, in some embodiments, the media bus transmits a control signal to the transcoding module, and the transcoding module obtains the media data from the data storage area based on the received control signal. For example, a transcoding architecture of the transcoding module is shown in FIG. 8. To be specific, the media bus 820 and the transcoding module 810 performs interaction of the control signal, and when the transcoding module 810 receives the control signal on which data processing needs to be performed, data is read from the queue 830 for processing. The foregoing transcoding module 810 may be the first transcoding module, or may be the second transcoding module. In some embodiments, a same queue or different queues may be used between the first transcoding module and the second transcoding module to buffer data.

Operation 703: Process the intermediate data into at least two pieces of second multimedia data in second formats through at least two second transcoding operations.

The first transcoding operation and the at least two second transcoding operations are operations performed based on that the media bus provides the data communication channel. The second transcoding operation includes at least one of encapsulation and encoding. In some embodiments, the second transcoding operation is an operation performed based on that the media bus provides the data communication channel. In some embodiments, data interaction is performed between the media bus and the second transcoding module, so that the second transcoding operation is performed by the second transcoding module, to process the intermediate data into the second multimedia data in the second format.

In other words, the intermediate data is processed into the second multimedia data in the second format through the data interaction between the media bus and the at least two second transcoding modules.

In some embodiments, module arrangement may be performed for a same data processing operation based on an operation standard corresponding to the second transcoding operation. For example, when arrangement of the encoding module is performed for video data, a first video encoding module configured to perform encoding based on an H.264 encoding standard and a second video encoding module configured to perform encoding based on an H.265 encoding standard may be arranged.

For example, the foregoing second format corresponding to the second multimedia data finally obtained through transcoding may be a target format determined based on a received media transcoding request. In some embodiments, the first format and the second format may be a same format or may be different formats.

Operation 704: Output the at least two pieces of second multimedia data in the second formats.

In some embodiments, the at least two pieces of second multimedia data in the second formats may be outputted to a storage area. In other words, the at least two pieces of second multimedia data obtained through transcoding are stored. For example, when the method is applied to the server, the foregoing storage area is a database in the server.

In some embodiments, at least two second formats are a plurality of second formats different from the first format. The at least two second formats are also different from each other.

In some embodiments, the at least two pieces of second multimedia data in the second formats may be transmitted to a connected network device. For example, when the method is applied to the server, the server may transmit the at least two pieces of second multimedia data to a terminal device with which the server establishes a communication connection. The at least two pieces of second multimedia data may be transmitted to a same terminal device, or may be transmitted to different terminal devices. This is not limited in the embodiments. The foregoing first multimedia data in the first format and the second multimedia data in the second format may also be expressed as the first multimedia data in the second format and the second multimedia data in the first format. In other words, the foregoing "first/second" is merely used for distinguishing media data before a transcoding procedure and media data after the transcoding procedure, and does not actually limit the format and the media data.

In conclusion, in the audio and video transcoding method provided in this application, public communication is provided for transmission of media data between transcoding modules during transcoding by using the media bus when the first multimedia data needs to be transcoded. In other words, each transcoding module obtains the media data from the media bus, and transmits processed media data to the media bus. In the foregoing process, the media bus provides public communication for data, thereby implementing data multiplexing, so that when the first multimedia data in the first format is transcoded into the second multimedia data in a plurality of different formats, processing of a same operation can be reduced, thereby improving utilization of a data resource and a computing resource.

Figure 9:
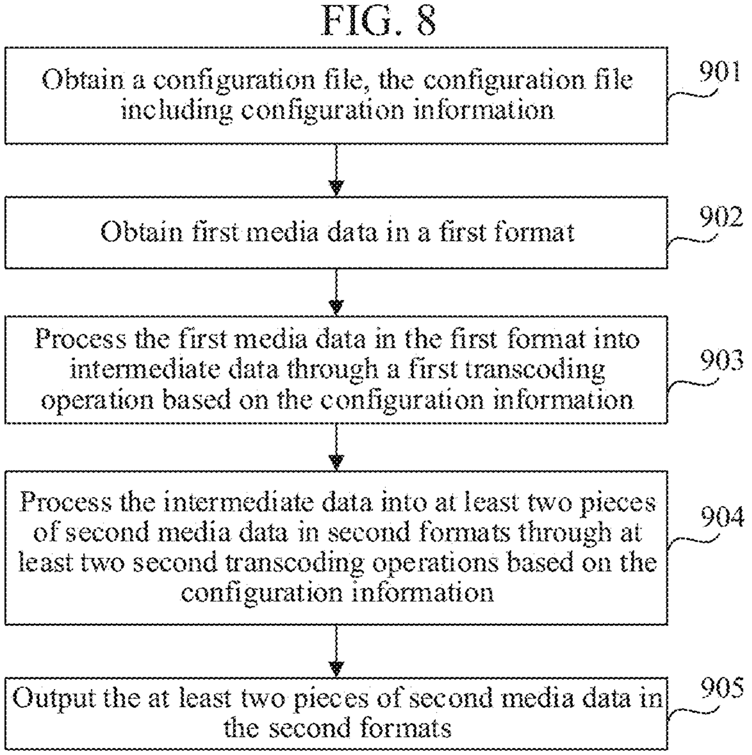
FIG. 9 is a flowchart of an audio and video transcoding method according to an exemplary embodiment of this application.

In some embodiments, to adapt to requirements on a transcoding configuration in different service scenarios, the transcoding procedure implemented through the media bus is controlled by providing a configuration file. FIG. 9 shows an audio and video transcoding method according to an exemplary embodiment of this application. The method includes the following operations.

Operation 901: Obtain a configuration file, the configuration file including configuration information.

The configuration information is configured for indicating a processing operation provided for first multimedia data. In some embodiments, the configuration information is read from the configuration file through a media bus.

The foregoing configuration information includes format indication information for a second format. In other words, the configuration information indicates a media format obtained after the first multimedia data is transcoded.

In some embodiments, the foregoing configuration information may include at least one type of information such as an encoding format, an encapsulation format, and attribute information that correspond to the second format; and/or the configuration information may include a transcoding module that needs to be enabled.

In some embodiments, the foregoing configuration file may be preconfigured, or may be generated in real time based on a media transcoding request, or may be determined from a candidate configuration file based on a transcoding request.

For example, when the foregoing configuration file is generated in real time based on the media transcoding request, after the media transcoding request is received, the configuration information is determined based on the second format indicated by the media transcoding request, to generate the configuration file.

In some embodiments, the foregoing process of generating the configuration file based on the media transcoding request may be implemented by a network device completing a transcoding process. For example, a gateway service in a server receives the media transcoding request transmitted by a terminal device, and the gateway service generates the corresponding configuration file based on the media transcoding request and transmits the configuration file to a media transcoding service. The foregoing process of generating the configuration file based on the media transcoding request may be alternatively implemented by another network device.

For example, when the foregoing configuration file is determined from the candidate configuration file based on the transcoding request, there is a format identifier of the to-be-transcoded second format corresponding to the received media transcoding request. The corresponding configuration file is obtained from a storage area based on the format identifier. The foregoing configuration file in the storage area is a preconfigured candidate file, and because a candidate format for media transcoding may be exhausted, efficiency of responding to the media transcoding request can be improved by using the preconfigured candidate file.

In some embodiments, the media bus is connected to a configuration module, and the configuration module is configured to parse the read configuration file, to obtain the configuration information.

In some embodiments, after the configuration information is obtained, the configuration information is transmitted to at least one transcoding module through the media bus. The configuration information is transmitted to each transcoding module for which the media bus provides a data communication channel, including a first transcoding module and at least two second transcoding modules.

For example, at least one transcoding module determines, based on the configuration information, target data that needs to be obtained from the media bus, and queries the target data in the media bus. In other words, in this embodiment of this application, each transcoding module is mounted to the media bus, and a transcoding module to be enabled is determined by using the configuration information in different service requirement scenarios. For example, the transcoding module obtains the configuration information from the media bus, and determines, based on the configuration information, whether a module needs to be enabled in a transcoding procedure this time, and/or determines, based on the configuration information, to query the target data in the media bus.

In an example, when the configuration information indicates that an encoding format of video data needs to be converted from H.264 to H.265, after it is determined that each transcoding module obtains the configuration information, a decapsulation module, a decoding module, an encoding module, and an encapsulation module in the transcoding module are enabled. The decoding module is configured to decode the first multimedia data in the encoding format of H.264, and the encoding module is configured to encode, based on the encoding format of H.265, decoded data outputted by the decoding module, and output encoded data.

Operation 902: Obtain the first multimedia data in a first format.

In some embodiments, the foregoing configuration information further includes a first input source corresponding to the first multimedia data. In other words, an input source to which the media transcoding service needs to be connected to obtain the first multimedia data is determined by using the configuration information.

In some embodiments, a reading module is mounted to the media bus. When the media bus includes the configuration information, the reading module reads the configuration information from the media bus, and determines a first data source corresponding to a current transcoding process based on the configuration file. In some other embodiments, the foregoing reading module is connected to the first transcoding module in the transcoding module. For example, the reading module is connected to the decapsulation module. In other words, the reading module is connected to the first input source based on the configuration information, to read the first multimedia data and transmit the first multimedia data to the first transcoding module.

In an example, when the configuration information indicates to obtain the first multimedia data from a local file, the reading module is connected to the storage area of the network device and reads the first multimedia data from the storage area. In another example, when the configuration information indicates to obtain the first multimedia data from another network device, the reading module is connected to the gateway service, and the first multimedia data transmitted by another network device is received by the gateway service.

Operation 903: Process the first multimedia data in the first format into intermediate data through a first transcoding operation based on the configuration information.

In some embodiments, the first transcoding operation includes at least one of decapsulation and decoding.

The first multimedia data in the first format is processed into the intermediate data through a decapsulation operation when the configuration information indicates to decapsulate the first multimedia data; and the first multimedia data in the first format is processed into the intermediate data through a decoding operation when the configuration information indicates to decode the first multimedia data.

In some embodiments, after the media bus transmits the configuration information to each transcoding module, the first transcoding module processes the first multimedia data in the first format into the intermediate data through the first transcoding operation based on the configuration information.

Operation 904: Process the intermediate data into at least two pieces of second multimedia data in second formats through at least two second transcoding operations based on the configuration information.

In some embodiments, the second transcoding operation includes at least one of encoding and encapsulation.

The intermediate data is encoded into the at least two pieces of second multimedia data in the second formats through encoding operations respectively corresponding to at least two encoding formats when the configuration information indicates to encode the intermediate data; and the intermediate data is encapsulated into the at least two pieces of second multimedia data in the second formats through an encapsulation operation when the configuration information indicates to encapsulate the intermediate data.

In some embodiments, after the media bus transmits the configuration information to each transcoding module, the at least two second transcoding modules process the intermediate data into the second multimedia data in the second formats through different second transcoding operations based on the configuration information.

In some embodiments, the second transcoding operation further includes a preprocessing operation. In this way, when the configuration information indicates to preprocess the intermediate data, the intermediate data is preprocessed in at least two preprocessing manners, to obtain the at least two pieces of second multimedia data in the second formats.

For example, when the transcoding module to be enabled and indicated by the configuration information includes the decapsulation module and the encapsulation module, the configuration information may include a first encapsulation format corresponding to the first multimedia data and a second encapsulation format corresponding to the second multimedia data, the decapsulation module performs decapsulation based on the foregoing first encapsulation format, and the encapsulation module performs encapsulation based on the foregoing second encapsulation format.

For example, when the transcoding module to be enabled and indicated by the configuration information includes the decoding module and the encoding module, the configuration information may include a first encoding format corresponding to the first multimedia data and a second encoding format corresponding to the second multimedia data, the decoding module performs decoding based on the foregoing first encoding format, and the encoding module performs encoding based on the foregoing second encoding format.

For example, when the configuration information indicates to enable a preprocessing module, the configuration information may include a specified preprocessing operation needed during transcoding, and the preprocessing module preprocesses, based on the foregoing specified preprocessing operation, the intermediate data obtained from the media bus.

Operation 905: Output the at least two pieces of second multimedia data in the second formats.

In some embodiments, the foregoing configuration information further includes a receiver of the second multimedia data when the second multimedia data is outputted. In this way, the at least two pieces of second multimedia data in the second formats are outputted to the receiver based on the receiver configured in the configuration information.

In some embodiments, a writing module is mounted to the media bus. When the media bus includes the configuration information, the writing module reads the configuration information from the media bus, and determines, based on the configuration information, a receiver of the media data after the transcoding is completed. In some other embodiments, the foregoing writing module is connected to the second transcoding module in the transcoding module. In other words, after processing the intermediate data, the second transcoding module directly transmits the obtained second multimedia data to the writing module, to output the second multimedia data.

In an example, when the configuration information indicates to locally store the second multimedia data, the writing module is connected to the storage area of the network device. In another example, when the configuration information indicates to transmit the second multimedia data to another network device, the writing module is connected to the gateway service, and the second multimedia data is transmitted by the gateway service to the network device indicated by the configuration information.

Figure 10:
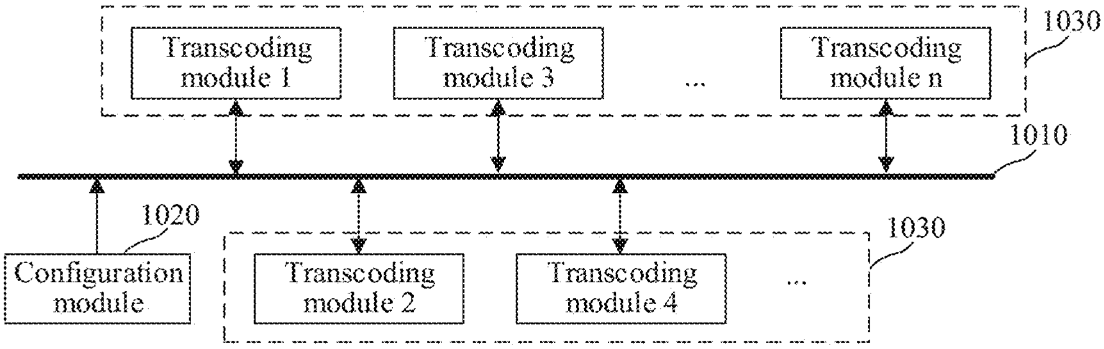
FIG. 10 is a schematic diagram of a transcoding architecture according to an exemplary embodiment of this application.

For example, FIG. 10 shows a transcoding architecture according to an exemplary embodiment of this application. A media bus 1010 is connected to a configuration module 1020. The configuration module 1020 can transmit configuration information parsed from a configuration file to the media bus 1010, and the media bus 1010 transmits the configuration information to each mounted transcoding module 1030. In some embodiments, because the configuration module 1020 only writes the configuration information into the media bus 1010 without reading information from the media bus 1010, a unidirectional data transmission connection may be used between the configuration module 1020 and the media bus 1010.

In conclusion, in the audio and video transcoding method provided in this embodiment of this application, an invoking situation of the transcoding module during transcoding is indicated by using the configuration file, for the transcoding module, a transcoding module needed to be enabled in a current transcoding procedure is configured, improving adaptability of an overall architecture in different service requirement scenarios.

Figure 11:
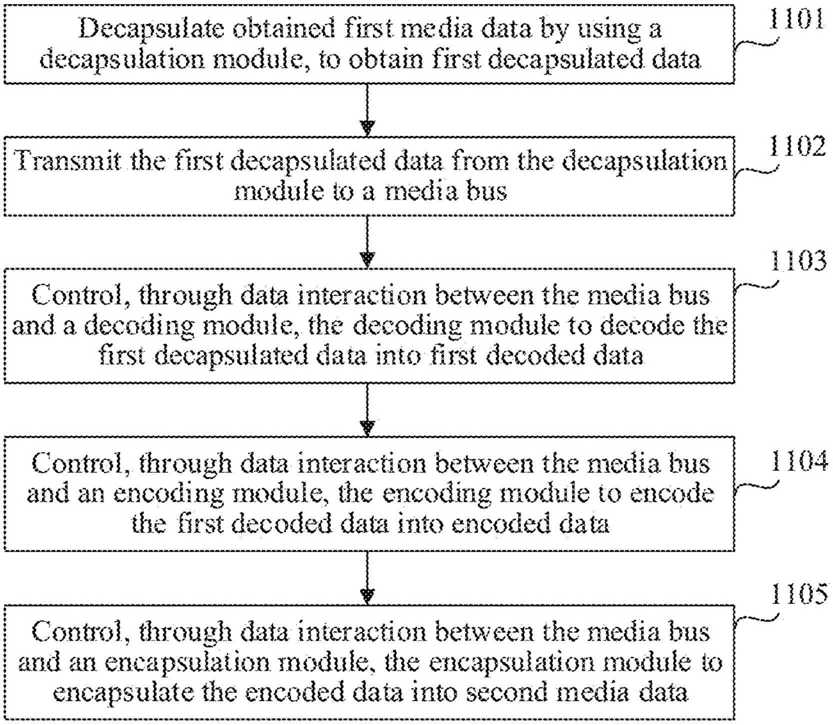
FIG. 11 is a flowchart of an audio and video transcoding method according to an exemplary embodiment of this application.

In some embodiments, processes of decapsulation-encapsulation and decoding-encoding of the media data are needed during transcoding. For example, in this case, with reference to a structure of the foregoing audio and video transcoding apparatus, data interaction between the media bus and the transcoding module is exemplarily described. The transcoding module includes the decapsulation module, the decoding module, the encoding module, and the encapsulation module. FIG. 11 shows an audio and video transcoding method according to an exemplary embodiment of this application. The method includes the following operations.

Operation 1101: Decapsulate obtained first multimedia data by using a decapsulation module, to obtain first decapsulated data.

In some embodiments, a transcoding module in transcoding systems processing different service requirements is fixed, and a specified transcoding module is enabled by configuration information. In this way, a first format and a second format may be indicated by the configuration information in a configuration file, and the configuration information indicates to enable the decapsulation module, a decoding module, an encoding module, and an encapsulation module.

In some embodiments, transcoding module configurations in the transcoding systems processing different service requirements are different. In other words, different transcoding systems are configured based on the different service requirements. In this way, when it determined that the first format and the second format are different, the first multimedia data is inputted into a transcoding system with the transcoding module including the decapsulation module, the decoding module, the encoding module, and the encapsulation module.

In some embodiments, the decapsulation module is connected to a reading module, and the reading module accesses a first input source and reads the first multimedia data from the first input source.

For example, the decapsulation module decapsulates the first multimedia data based on a first encapsulation format indicated by the first format. In an example, when the first multimedia data is audio and video data, the decapsulation module decapsulates the first multimedia data, and the obtained first decapsulated data includes decapsulated audio data and decapsulated video data.

Operation 1102: Transmit the first decapsulated data from the decapsulation module to a media bus.

For example, the decapsulation module transmits the first decapsulated data to the media bus after completing decapsulating the first multimedia data.

In some embodiments, the decapsulation module transmits the first decapsulated data to the media bus when detecting that the media bus is at an idle state.

In some embodiments, the decapsulated audio data is transmitted to the media bus, and then the decapsulated video data is transmitted to the media bus when the media bus is at the idle state. Alternatively, the decapsulated video data is first transmitted to the media bus, and then the decapsulated audio data is transmitted to the media bus when the media bus is at the idle state.

Operation 1103: Control, through data interaction between the media bus and the decoding module, the decoding module to decode the first decapsulated data into first decoded data.

In some embodiments, when the decoding module queries that the media bus includes the first decapsulated data, the foregoing first decapsulated data is read from the media bus.

For example, the decoding module decodes the first decapsulated data based on an encoding format indicated by the first format. In some embodiments, for the media data in different data forms, different decoding modules need to be invoked for processing the data. For example, when the media bus includes the decapsulated audio data, an audio decoding module obtains the decapsulated audio data and decodes the decapsulated audio data, to obtain decoded audio data. In an example, the foregoing decoded audio data may be audio pulse code modulation (PCM) data. When the media bus includes the decapsulated video data, a video decoding module obtains the decapsulated video data and decodes the decapsulated video data, to obtain decoded video data. In an example, the foregoing decoded video data may be video color encoding (YUV) data.

In some embodiments, the decoding module transmits the first decoded data to the media bus when detecting that the media bus is at the idle state. For example, when the decoding module decodes the first decapsulated data into the first decoded data, the decoding module transmits the first decoded data to the media bus. In some embodiments, the decoded audio data is transmitted to the media bus, and then the decoded video data is transmitted to the media bus when the media bus is at the idle state. Alternatively, the decoded video data is first transmitted to the media bus, and then the decoded audio data is transmitted to the media bus when the media bus is at the idle state.

Operation 1104: Control, through data interaction between the media bus and the encoding module, the encoding module to encode the first decoded data into encoded data.

In some embodiments, when the encoding module queries that the media bus includes the first decoded data, the foregoing first decoded data is read from the media bus.

For example, the encoding module encodes the first decoded data based on an encoding format indicated by the second format. In some embodiments, for the media data in different data forms, different encoding modules need to be invoked for processing the data. For example, when the media bus includes the decoded audio data, an audio encoding module obtains the decoded audio data and encodes the decoded audio data, to obtain encoded audio data. When the media bus includes the decoded video data, a video encoding module obtains the decoded video data and encodes the decoded video data, to obtain encoded video data.

In some embodiments, a plurality of encoding modules may be arranged and coexist based on different service requirements.

Figure 12:
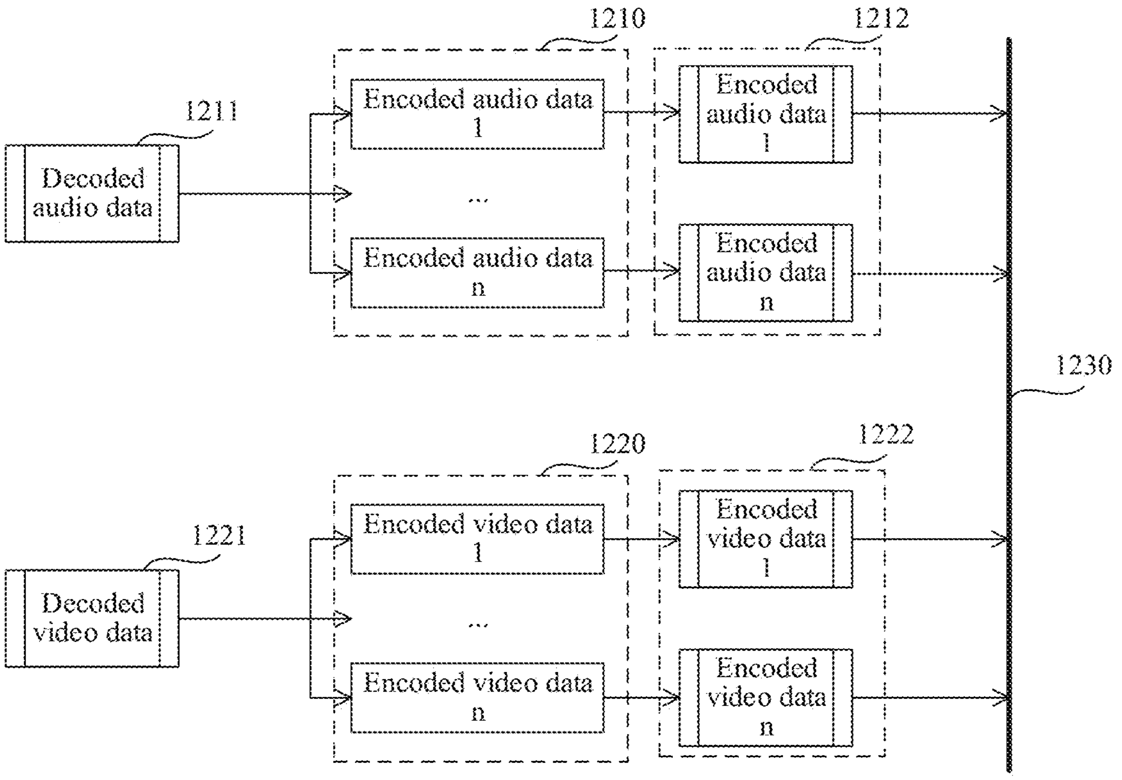
FIG. 12 is a schematic diagram of encoding according to an exemplary embodiment of this application.

In an example, FIG. 12 shows a schematic diagram of encoding according to an exemplary embodiment of this application. Decoded audio data 1211 is inputted into an audio encoding module 1210, and the audio encoding module 1210 inputs outputted encoded audio data 1212 into a media bus 1230. Decoded video data 1221 is inputted into a video encoding module 1220, and the video encoding module 1220 inputs outputted encoded video data 1222 into the media bus 1230. In some embodiments, the encoding module transmits the encoded data to the media bus when detecting that the media bus is at the idle state. For example, when the encoding module encodes the first decoded data into the encoded data, the encoding module transmits the encoded data to the media bus.

In some embodiments, a preprocessing module may be further arranged between a decoding module and the encoding module. The preprocessing module is configured to perform at least one processing operation of noise reduction, frame rate adjustment, scaling, sampling rate adjustment, sampling resolution adjustment, and volume adjustment on the first decoded data. For example, when the first decoded data is the decoded audio data, the preprocessing module may be configured to perform at least one processing operation of noise reduction, sampling rate adjustment, sampling resolution adjustment, and volume adjustment on the decoded audio data. When the first decoded data is the decoded video data, the preprocessing module may be configured to perform at least one of noise reduction, frame rate adjustment, scaling, sampling rate adjustment, and sampling resolution adjustment on the decoded video data.

For example, through data interaction between the media bus and the preprocessing module, the preprocessing module is controlled to preprocess the first decoded data, to obtain intermediate data; and through data interaction between the media bus and the encoding module, the encoding module is controlled to encode the intermediate data into the encoded data.

In some embodiments, a plurality of preprocessing modules may be configured based on a service requirement. In some embodiments, for the media data in different data forms, the data is preprocessed by using different preprocessing modules.

Figure 13:
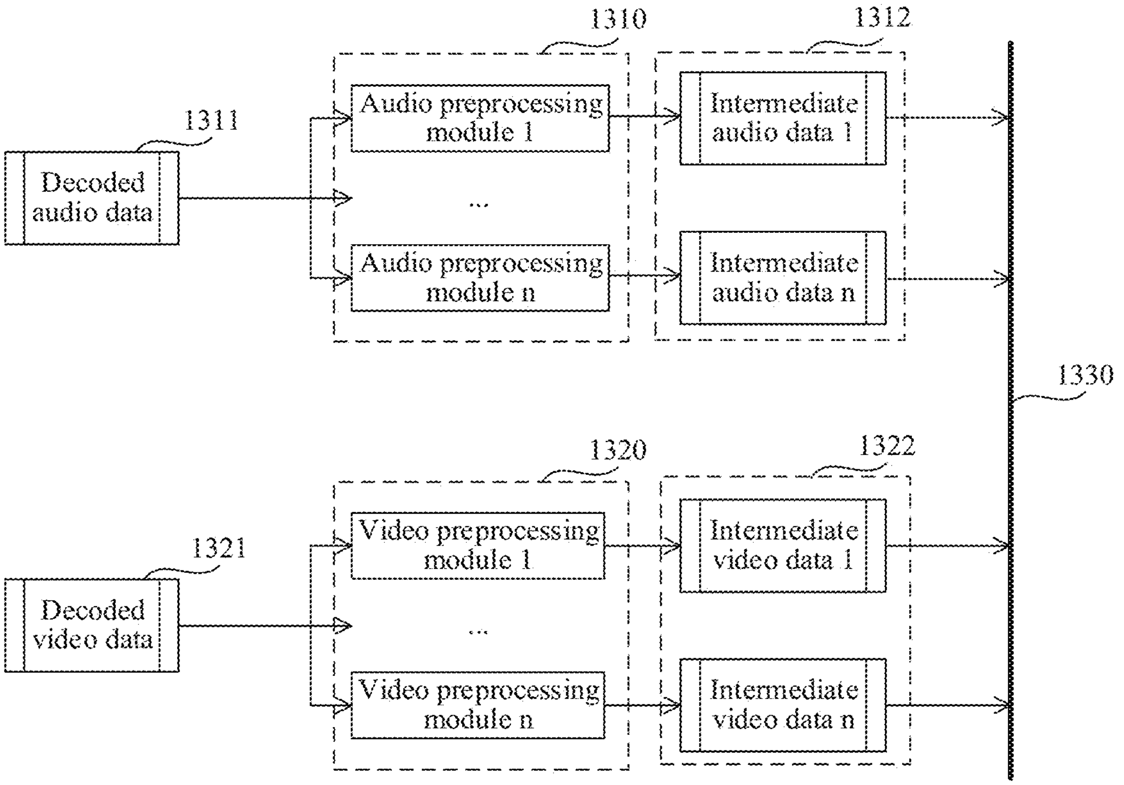
FIG. 13 is a schematic diagram of preprocessing according to an exemplary embodiment of this application.

In an embodiment, FIG. 13 shows a schematic diagram of preprocessing according to an exemplary embodiment of this application. Decoded audio data 1311 is inputted into an audio preprocessing module 1310, and the audio preprocessing module 1310 inputs outputted intermediate audio data 1312 into a media bus 1330. Decoded video data 1321 is inputted into a video preprocessing module 1320, and the video preprocessing module 1320 inputs outputted intermediate video data 1322 into the media bus 1330.

Operation 1105: Control, through data interaction between the media bus and the encapsulation module, the encapsulation module to encapsulate the encoded data into second multimedia data.

In some embodiments, when the encapsulation module queries that the media bus includes the encoded data, the foregoing encoded data is read from the media bus. For example, the encapsulation module encapsulates the encoded data based on an encapsulation format indicated by the second format.

In an example, when the media data is the audio and video data, the encapsulation module obtains the encoded audio data and the encoded video data from the media data, and encapsulates the foregoing encoded audio data and the encoded video data into the second multimedia data based on the encapsulation format indicated by the second format. In some embodiments, the encapsulation module is connected to a writing module, and the writing module writes the second multimedia data into a local storage area based on a requirement. In other words, the second multimedia data is stored as a local file, or a network interface is invoked to transmit the second multimedia data. In some embodiments, there may be a one-to-one correspondence between the foregoing encapsulation module and the writing module, or a plurality of writing modules may be mounted to one encapsulation module.

In conclusion, in the audio and video transcoding method provided in this embodiment of this application, interaction is performed between the media bus and the decapsulation module, the encapsulation module, the decoding module, the encoding module, and the preprocessing module, and because information communication is implemented by the media bus, a plurality of modules such as the encoding module and the preprocessing module can be configured on the media bus, thereby implementing efficient data multiplexing. For example, when there are a plurality of encoding modules mounted, the encoded data in a plurality of encoding formats can be generated based on the first decoded data.

In an example, there is a possibility of one type of data multiplexing. For example, the first multimedia data is the audio and video data, and the transcoding module includes a video processing module, an audio processing module, and the encapsulation module. When audio encoding requirements corresponding to at least two second formats are the same, and video encoding requirements corresponding to the at least two second formats are different, after the first multimedia data is decapsulated into first audio data and first video data, data interaction is performed through the media bus and at least two video processing modules. Video transcoding is performed by the at least two video processing modules separately on the first video data, to obtain at least two pieces of second video data, and the second video data is data satisfying a video encoding requirement. Data interaction is performed through the media bus and the audio processing module. Audio transcoding is performed by the audio processing module on the first audio data, to obtain second audio data, and the second audio data is data satisfying an audio encoding requirement. Data interaction is performed through the media bus and the encapsulation module. The at least two pieces of second video data are separately encapsulated with the second audio data by the encapsulation module, to obtain at least two pieces of second multimedia data in the second formats. In other words, when transcoding is needed for obtaining a plurality of pieces of second multimedia data, and audio encoding formats corresponding to different second multimedia data are the same, it represents that transcoding of the audio data may be multiplexed during transcoding of the entire audio and video data, thereby reducing consumption of a data resource and a computing resource during multi-format outputting.

In another example, there is further a possibility of one type of data multiplexing. For example, the first multimedia data is the audio and video data, and the transcoding module includes a video processing module, an audio processing module, and the encapsulation module. When the first multimedia data and the second multimedia data are obtained through encapsulating the same audio data, after the first multimedia data is decapsulated into first audio data and first video data, data interaction is performed through the media bus and at least two video processing modules. Video transcoding is performed by the at least two video processing modules separately on the first video data, to obtain at least two pieces of second video data. Data interaction is performed through the media bus and the encapsulation module. At least two pieces of second video data are separately encapsulated with the first audio data by the encapsulation module, to obtain at least two pieces of second multimedia data in the second formats.

Figure 14:
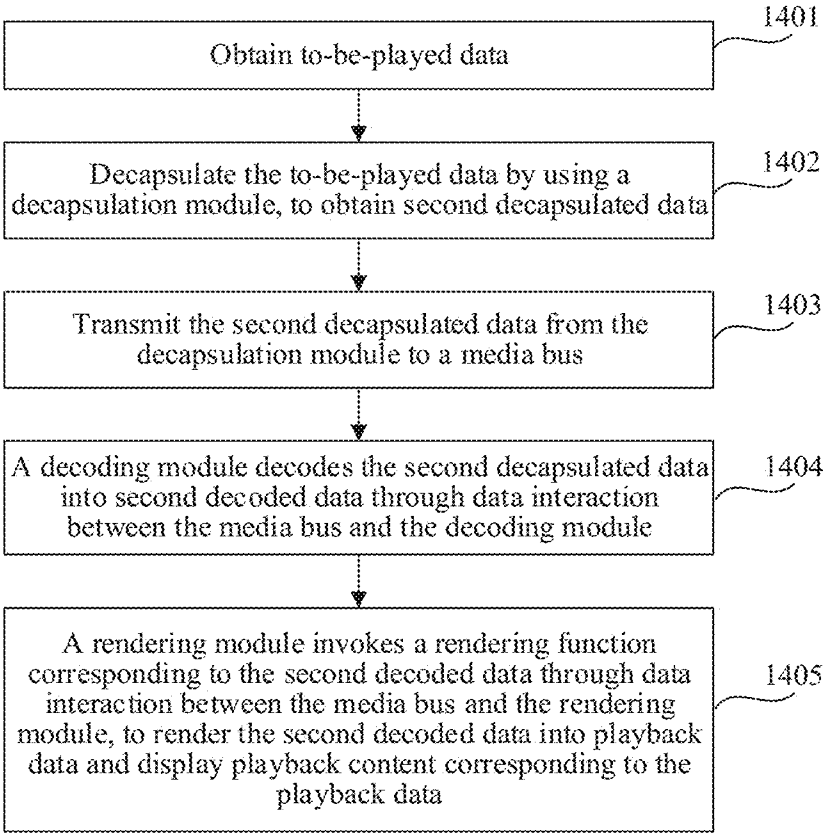
FIG. 14 is a flowchart of an audio and video transcoding method according to an exemplary embodiment of this application.

In some embodiments, the media bus provided in this embodiment of this application may be further used in a playback scenario of the media data. FIG. 14 shows an audio and video transcoding method according to an exemplary embodiment of this application. The method includes the following operations.

Operation 1401: Obtain to-be-played data.

For example, a data form of the foregoing to-be-played data includes at least one of audio and a video. The to-be-played data corresponds to a third format. In some embodiments, a reading module is connected to a second input source. In some embodiments, the to-be-played data may be data read from a storage area in a terminal device, or may be a real-time media stream received from a network interface by the reading module.

Operation 1402: Decapsulate the to-be-played data by using a decapsulation module, to obtain second decapsulated data.

In some embodiments, the decapsulation module is connected to the reading module, and the reading module accesses a second input source and reads the to-be-played data from the second input source.

For example, the decapsulation module decapsulates the to-be-played data based on a third encapsulation format indicated by the third format. In an example, when the to-be-played data is audio and video data, the decapsulation module decapsulates the to-be-played data, and the obtained second decapsulated data includes audio data and video data.

Operation 1403: Transmit the second decapsulated data from the decapsulation module to a media bus.

For example, the decapsulation module transmits the second decapsulated data to the media bus after completing decapsulating the to-be-played data.

In some embodiments, the decapsulation module transmits the second decapsulated data to the media bus when detecting that the media bus is at an idle state.

Operation 1404: A decoding module decodes the second decapsulated data into second decoded data through data interaction between the media bus and the decoding module.

In some embodiments, when the decoding module queries that the media bus includes the second decapsulated data, the foregoing second decapsulated data is read from the media bus. For example, the decoding module decodes the second decapsulated data based on an encoding format indicated by the third format. For example, when the decoding module decodes the second decapsulated data into the second decoded data, the decoding module transmits the second decoded data to the media bus. In some embodiments, the decoding module transmits the second decoded data to the media bus when detecting that the media bus is at the idle state.

Operation 1405: A rendering module invokes a rendering function corresponding to the second decoded data through data interaction between the media bus and the rendering module, to render the second decoded data into playback data and display playback content corresponding to the playback data.

In some embodiments, when the rendering module queries that the media bus includes the second decoded data, the foregoing second decoded data is read from the media bus. In some embodiments, when the to-be-played data is the audio and video data, the second decoded data includes decoded video data and decoded audio data. The decoded video data is inputted into a video rendering module at a rendering stage, and the decoded audio data is inputted into an audio rendering module at the rendering stage. Specifically, the video rendering module renders the decoded video data, to obtain a video frame, and plays the video frame. The audio rendering module renders the decoded audio data, to obtain an audio frame, and plays the audio frame.

Figure 15:
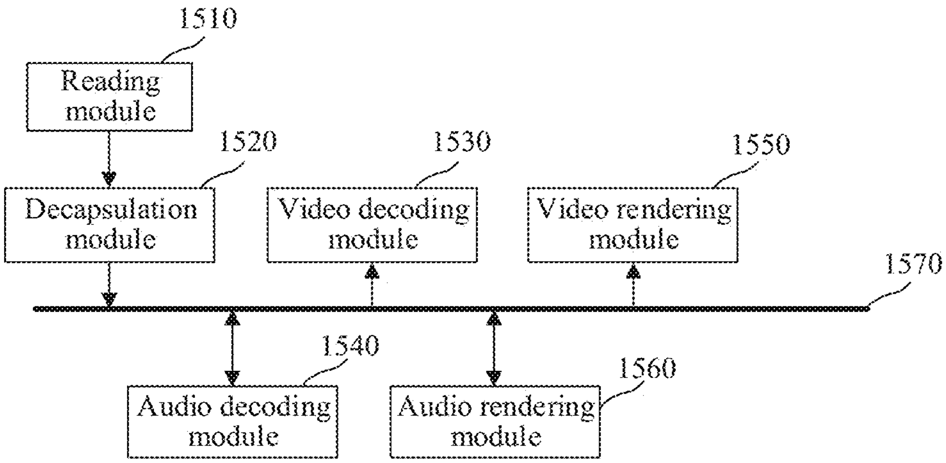
FIG. 15 is a schematic diagram of a playback system according to an exemplary embodiment of this application.

In an example, FIG. 15 shows a schematic diagram of a playback system 1500 according to an exemplary embodiment of this application. The playback system 1500 includes a reading module 1510, a decapsulation module 1520, a video decoding module 1530, an audio decoding module 1540, a video rendering module 1550, an audio rendering module 1560, and a media bus 1570.

In some embodiments, the media bus in the playback system may be a media bus shared with a transcoding system, or the media bus in the playback system is different from a media bus in the transcoding system.

In conclusion, in the audio and video transcoding method provided in this embodiment of this application, processes of decapsulation, decoding, and rendering of the media data are implemented by using the media bus in a player. In a playback scenario of the media data, data utilization can be improved by data multiplexing. For example, in a multi-screen display process controlled by a single terminal, rendering modules that can adapt to different display screens may be mounted, and the rendering modules all use the same decoded data to render and play the media data.

Figure 16:
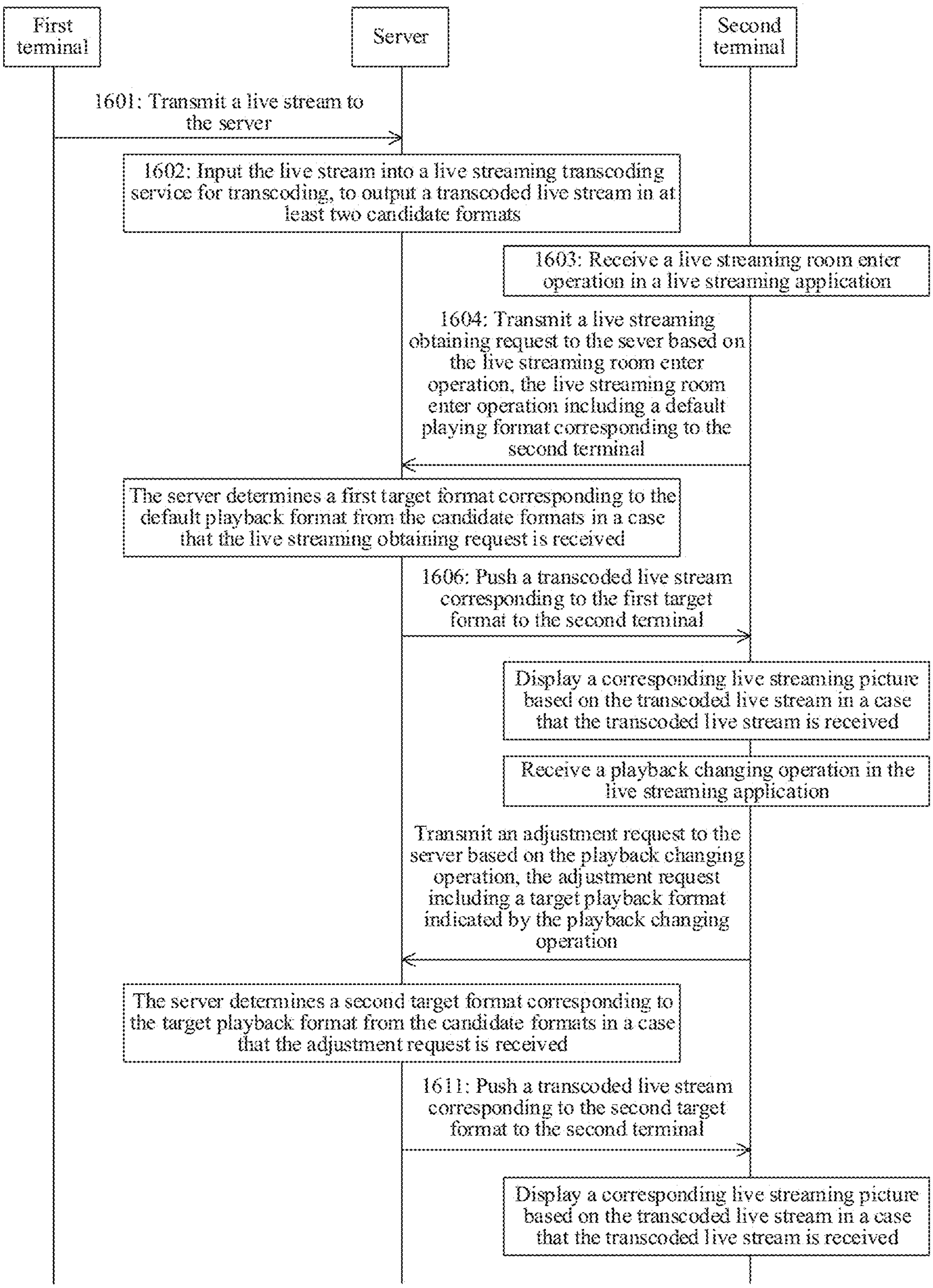
FIG. 16 is a flowchart of an audio and video transcoding method in a live streaming scenario according to an exemplary embodiment of this application.

In some embodiments, that the audio and video transcoding method provided in this embodiment of this application is applied to a live streaming scenario is exemplarily described. The live streaming scenario includes a first terminal corresponding to an anchor terminal, a server corresponding to a live streaming application, and a second terminal corresponding to an audience terminal. For example, FIG. 16 shows an audio and video transcoding method in a live streaming scenario according to an exemplary embodiment of this application. The method includes the following operations.

Operation 1601: The first terminal transmits a live stream to the server.

The foregoing first terminal is the anchor terminal. In some embodiments, the live stream includes at least one of audio data and video data.

In some embodiments, due to a limitation of a network bandwidth, to improve transmission efficiency of the live stream, the live stream is transcoded before the first terminal transmits the live stream to the server. In other words, an acquired original live stream is transcoded into a transcoded live stream satisfying a network bandwidth requirement, and the transcoded live stream is transmitted to the server through a communication network.

Operation 1602: The server inputs the live stream into a live streaming transcoding service for transcoding, to output transcoded live streams in at least two candidate formats.

For example, due to differences in network conditions and playback capabilities of terminal devices of different audience terminals, to improve a pushing effect of the live stream, the server needs to provide different live streams for the different audience terminals, to avoid a playback anomaly case such as freezing or a delay.

Figure 17:
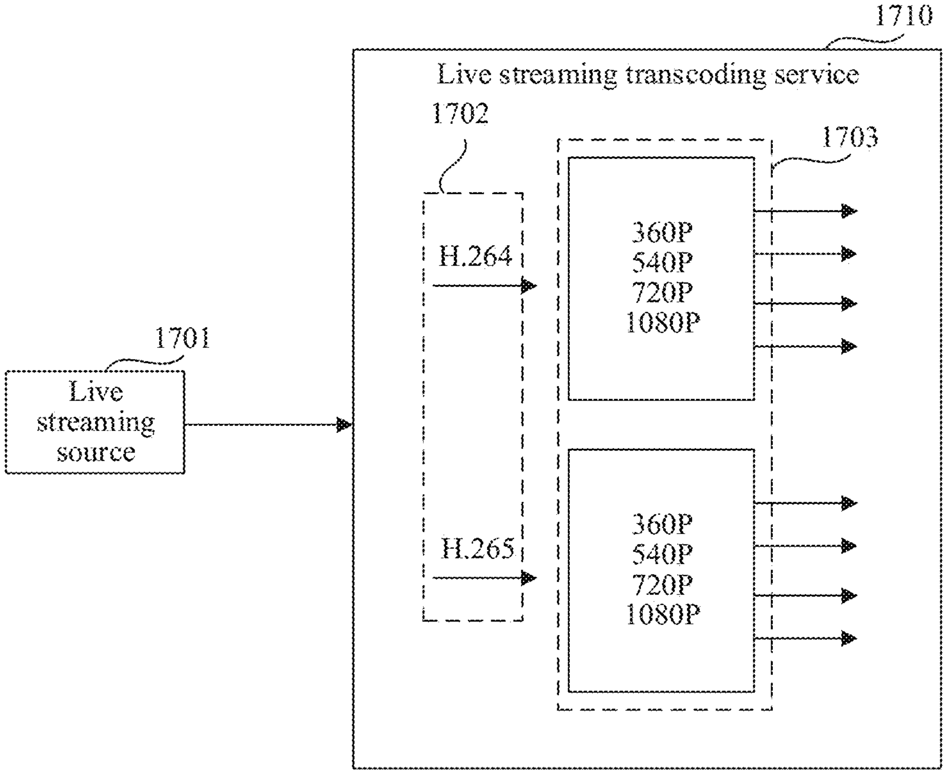
FIG. 17 is a schematic diagram of outputting of transcoding streams of different specifications according to an exemplary embodiment of this application.

In some embodiments, a process of transcoding the live stream in the server is implemented through one-input multi-format output transcoding. In an example, FIG. 17 shows a schematic diagram of outputting of transcoding streams of different specifications according to an exemplary embodiment of this application. A live stream 1701 is inputted into a live streaming transcoding service 1710, and the live streaming transcoding service 1710 outputs transcoding streams corresponding to a plurality of candidate formats based on a difference 1702 in a video encoding manner and a difference 1703 in video clarity.

In some embodiments, to reduce a waste of a server resource, when the server determines that there is an audience terminal connected to a live streaming room, the live streaming transcoding service is started to transcode the live stream. In some other embodiments, if there are less audience in the live streaming room, transcoding processes for different candidate formats in the live streaming transcoding service may be started based on a need of the audience terminal in the live streaming room, thereby reducing the waste of a computing resource in the server.

Operation 1603: The second terminal receives a live streaming room enter operation in the live streaming application.

The foregoing second terminal is the audience terminal. For example, the live streaming application is run in the second terminal. When determining that the live streaming room enter operation is received, the second terminal generates a live streaming obtaining request corresponding to the live streaming room enter operation, and obtains the live stream from the server corresponding to the live streaming application based on the live streaming obtaining request.

Operation 1604: The second terminal transmits the live streaming obtaining request to the sever based on the live streaming room enter operation, the live streaming room enter operation including a default playback format corresponding to the second terminal.

In some embodiments, the foregoing default playback format may be a video playback format determined by the live streaming application based on a current network status and/or device information of the second terminal. Alternatively, the foregoing default playback format may be a video playback format used by the live streaming application during live streaming picture displaying last time. The live streaming application is fully authorized by a terminal user when obtaining the network status and/or the device information of the second terminal.

Operation 1605: When the server receives the live streaming obtaining request, the server determines a first target format corresponding to the default playback format from the candidate formats.

After receiving the live streaming obtaining request, the server first perform an authentication on the live streaming obtaining request, to determine that the second terminal indicating the live streaming obtaining request has an authority to enter the live streaming room. In response to determining that the live streaming obtaining request is legal, the server parses the live streaming obtaining request to obtain the default playback format corresponding to the second terminal, and matches the default playback format with the candidate formats, to determine the first target format from the candidate formats.

Operation 1606: The server pushes a transcoded live stream corresponding to the first target format to the second terminal.

In some embodiments, when the first target format matching with the default playback format does not exist in the candidate formats, the server may start a transcoding procedure corresponding to the default playback format in the live streaming transcoding service. Alternatively, the server determines a third target format close to the default playback format from the candidate formats. A device hardware condition of the second terminal can satisfy playing a live stream in the third target format. The server further carries prompt information when transmitting a transcoded live stream in the third target format to the second terminal, and the second terminal prompts a format corresponding to a current live streaming picture based on the prompt information.

Operation 1607: Display a corresponding live streaming picture based on the transcoded live stream when the second terminal receives the transcoded live stream.

For example, the second terminal decapsulates the received transcoded live stream to obtain a decapsulated live stream, decodes the decapsulated live stream to obtain a decoded live stream, inputs the decoded live stream into a rendering module, generates a live streaming picture by invoking a corresponding rendering function, and displays the live streaming picture through a display component.

Operation 1608: The second terminal receives a playback changing operation in the live streaming application.

For example, the live streaming application further provides a changing function for a playback format. In some embodiments, at least one attribute of a bit rate, resolution, clarity, and a screen size of the live stream may be changed through the playback changing operation, to determine a target playback format.

Operation 1609: The second terminal transmits an adjustment request to the server based on the playback changing operation, the adjustment request including the target playback format indicated by the playback changing operation.

Figure 18:
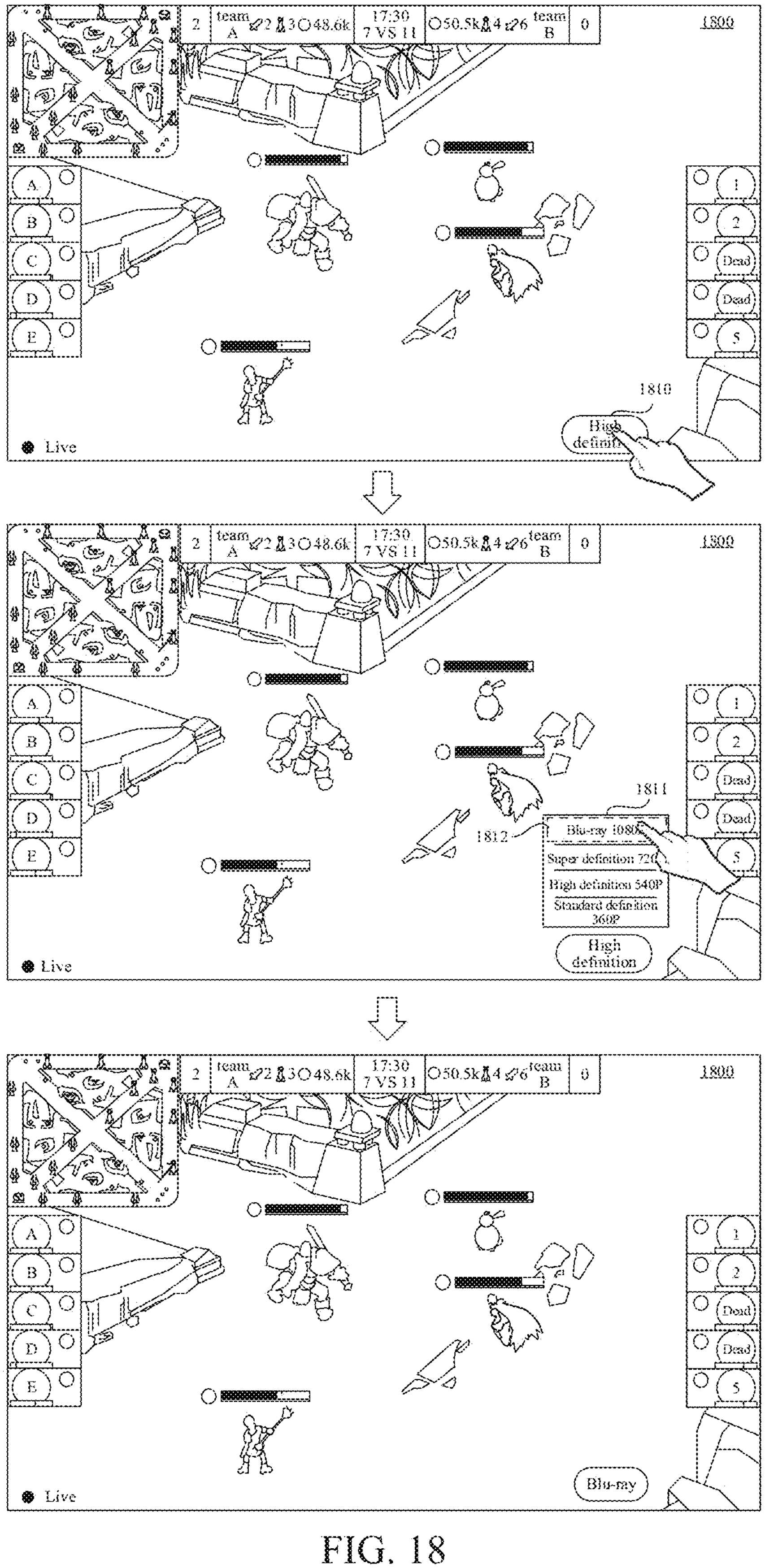
FIG. 18 is a schematic diagram of changing a playback format according to an exemplary embodiment of this application.

In an example, FIG. 18 is a schematic diagram of changing a playback format according to an exemplary embodiment of this application. A live streaming interface 1800 in a live streaming application includes a playback format changing control 1810. When the playback format changing control 1810 receives a trigger operation, at least one candidate playback format 1811 is displayed. When a target playback format 1812 in the candidate playback format 1811 receives the trigger operation, an adjustment request is transmitted to a server based on the target playback format 1812. The server transmits a live stream corresponding to the target playback format back to a second terminal based on the adjustment request. The live streaming application displays a live streaming picture in the target playback format 1812 in the live streaming interface 1800.

Operation 1610: When the server receives the adjustment request, the server determines a second target format corresponding to the target playback format from the candidate formats.

After receiving the adjustment request, the server first perform an authentication on the adjustment request, to determine that the second terminal indicating the adjustment request has an authority to adjust a playback format into the target playback format. In response to determining that the adjustment request is legal, the server parses the adjustment request to obtain the target playback format, and matches the target playback format with the candidate formats, to determine the second target format from the candidate formats.

Operation 1611: The server pushes a transcoded live stream corresponding to the second target format to the second terminal.

In some embodiments, when the second target format matching the default playback format does not exist in the candidate formats, or the first terminal does not have an authority to obtain a live stream in the target playback format, the server still pushes the transcoded live stream to the second terminal by using the first target format. In addition, prompt information is transmitted to the second terminal, and the prompt information is configured for prompting a playback format switching failure.

Operation 1612: Display a corresponding live streaming picture based on the transcoded live stream when the second terminal receives the transcoded live stream.

In some embodiments, after the second terminal changes the playback format, the live streaming application records the changing operation, to determine the target playback format as a default playback format corresponding to entering the live streaming room next time.

In conclusion, in the audio and video transcoding method provided in this embodiment of this application, processes of decapsulation, decoding, and rendering of the media data are implemented by using the media bus in the live streaming scenario. In a playback scenario of the media data, data utilization can be improved by data multiplexing. For example, when different viewing terminals correspond to different display requirements, different processes of decapsulation and encoding and decoding can be adaptively performed, improving data processing efficiency during live streaming.

In some embodiments, the audio and video transcoding method provided in this embodiment of this application may be further applied to a cloud gaming scenario. For example, a corresponding implementation operation may include the following operations. S1: A cloud server starts a cloud game. S2: A player terminal logs in a lobby and joins a cloud game room through the lobby. S3: The player terminal performs data stream simulation input. S4: The cloud server generates a corresponding gaming picture based on a simulation inputted data stream. S5: The cloud server generates a video stream corresponding to the gaming picture. S6: The cloud server transcodes, based on a device situation or an arrangement situation of the player terminal, the video stream into a transcoded video stream satisfying a requirement of the player terminal. S7: The cloud server transmits the transcoded video stream to the player terminal. S8: The player terminal displays a corresponding gaming picture based on the transcoded video stream.

In other words, a gaming picture in a cloud gaming process is generated by using the cloud server, and a video stream corresponding to the gaming picture is transcoded to obtain a transcoded video stream adapting to the terminal device. In addition, if the cloud game is a game in which a plurality of terminals jointly participate, because gaming pictures needed to be displayed of player terminals in a cloud gaming room may be the same, a video stream corresponding to the gaming picture may be uniformly generated through a transcoding process implemented by the media bus provided in this embodiment of this application, and different transcoded video streams are configured based on different player terminals, thereby improving user experience in the cloud gaming scenario and reducing data processing amount in a cloud game with a plurality of terminals involved.

The above is only an exemplary description of the scenario provided in this embodiment of this application. The method may also be applied to another scenario, such as an in-vehicle scenario, an on-demand scenario, or a local player scenario. The application scenario is not specifically limited herein.

Information (including, but not limited to, user device information, user personal information, and the like), data (including, but not limited to, data configured for analysis, stored data, presented data, and the like), and a signal involved in this application are all authorized by a user or fully authorized by all parties, and collection, use, and processing of relevant data are required to comply with a relevant law, regulation, and standard of a relevant country and region. For example, information related to the user such as device information involved in this application is all obtained under full authorization. In the audio and video transcoding apparatus provided in the foregoing embodiment, only divisions of the foregoing functional modules are described by using an example. During actual application, the foregoing functions may be allocated to and completed by different functional modules according to requirements, that is, the internal structure of the device is divided into different functional modules, to complete all or some of the foregoing described functions. In addition, the audio and video transcoding apparatus provided in the foregoing embodiment belongs to the same concept as the embodiment of the audio and video transcoding method. For a specific implementation process of the apparatus, reference may be made to the method embodiment, and details are not described herein again.

Figure 19:
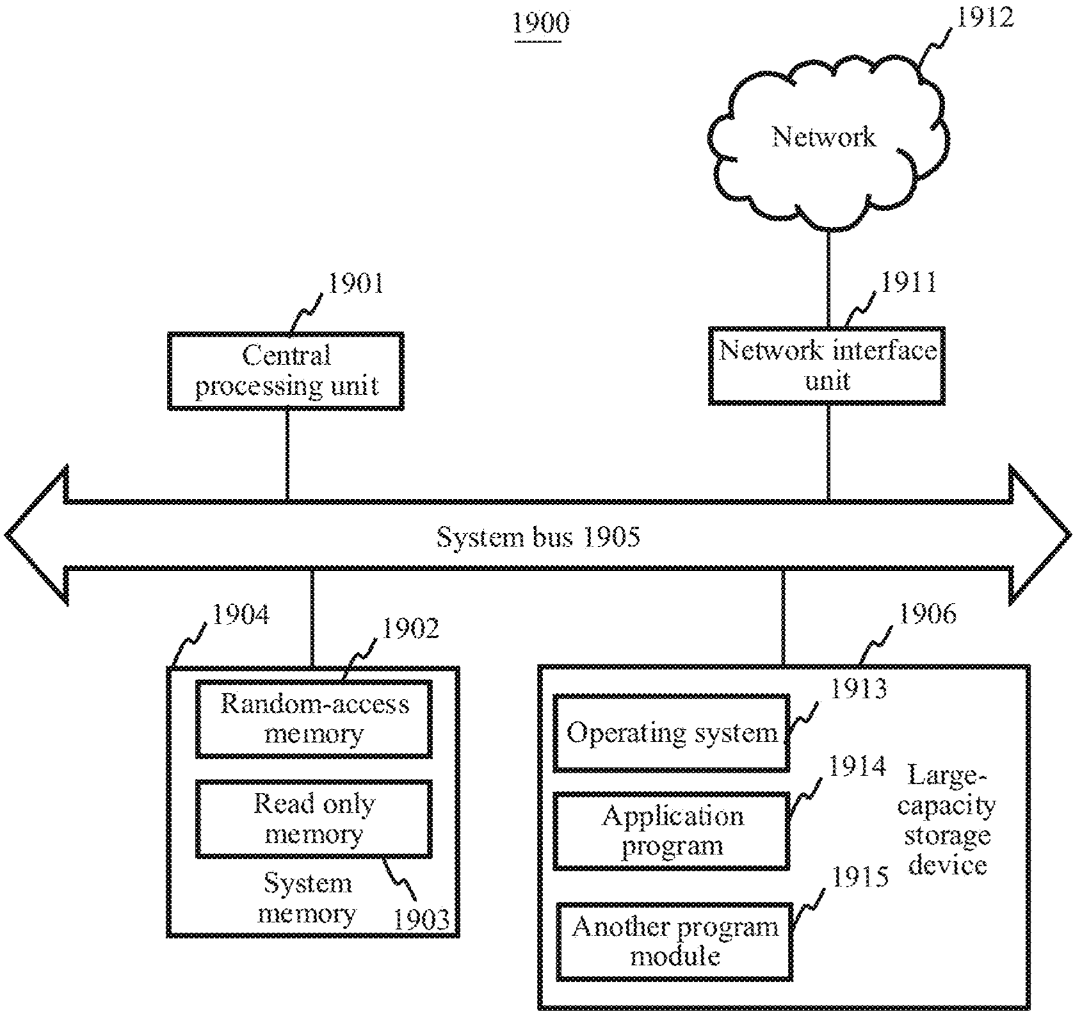
FIG. 19 is a schematic structural diagram of a server according to an exemplary embodiment of this application.

FIG. 19 is a schematic structural diagram of a server 1900 according to an exemplary embodiment of this application. Specifically, the following structure is included. The server 1900 includes a central processing unit (CPU) 1901, a system memory 1904 including a random access memory (RAM) 1902 and a read only memory (ROM) 1903, and a system bus 1905 connecting the system memory 1904 to the CPU 1901. The server 1900 further includes a large-capacity storage device 1906 configured to store an operating system 1913, an application program 1914, and another program module 1915. According to various embodiments of this application, the server 1900 may further be connected, by using a network such as the Internet, to a remote computer on the network and run. That is, the server 1900 may be connected to a network 1912 by using a network interface unit 1911 that is connected to the system bus 1905, or may be connected to a network of another type or a remote computer system (not shown) by using the network interface unit 1911. The memory further includes one or more programs, which are stored in the memory and are configured to be executed by the CPU.

Figure 20:
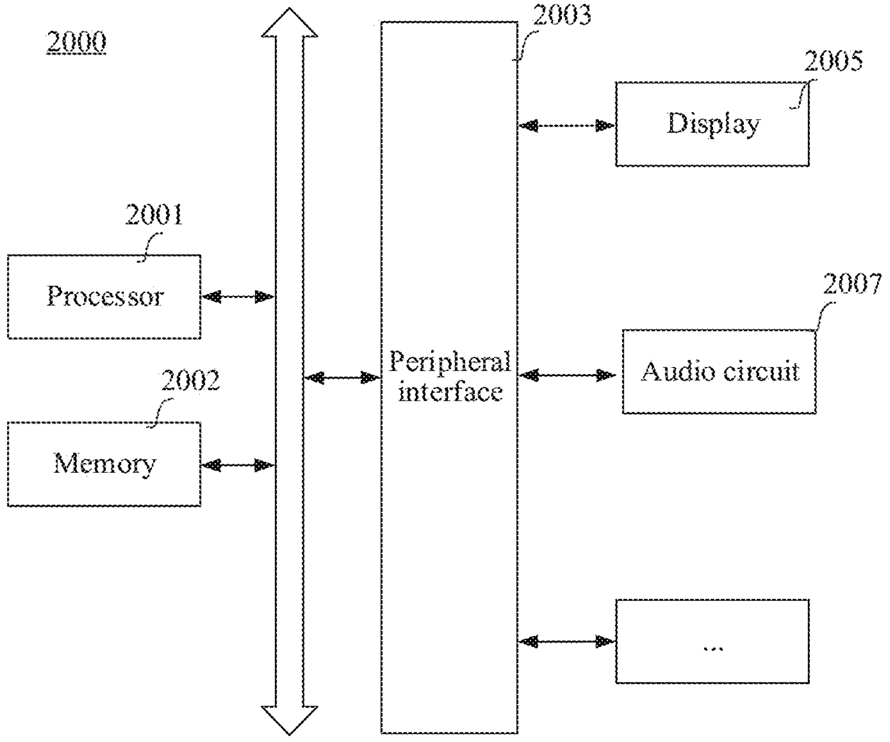
FIG. 20 is a structural block diagram of a terminal according to an exemplary embodiment of this application.

FIG. 20 is a structural block diagram of a terminal 2000 according to an exemplary embodiment of this application. The terminal 2000 may be a smartphone, a tablet computer, an MP3 player, an MP4 player, a notebook computer or a desktop computer, an in-vehicle terminal, or an aircraft. The terminal 2000 may also be referred to as another name such as user equipment, a portable terminal, a laptop terminal, or a desktop terminal.

Generally, the terminal 2000 includes: a processor 2001 and a memory 2002. The processor 2001 may include one or more processing cores. In some embodiments, the processor 2001 may further include an artificial intelligence (AI) processor. The AI processor is configured to process computing operations related to machine learning. The memory 2002 may include one or more computer-readable storage media that may be non-transitory. The memory 2002 may further include a high-speed random access memory and a non-volatile memory, for example, one or more disk storage devices or flash storage devices. In some embodiments, the non-transitory computer-readable storage medium in the memory 2002 is configured to store at least one instruction. The at least one instruction is executed by the processor 2001 to perform the control method based on a virtual battle provided in the method embodiment in this application. In some embodiments, the terminal 2000 may exemplarily include: a peripheral interface 2003 and at least one peripheral. The processor 2001, the memory 2002, and the peripheral interface 2003 may be connected through a bus or a signal cable. Each peripheral may be connected to the peripheral interface 2003 through a bus, a signal cable, or a circuit board. For example, the peripheral includes a display 2005 and an audio circuit 2007. For example, the terminal 2000 further includes another component. A person skilled in the art may understand that the structure shown in FIG. 20 constitutes no limitation on the terminal 2000, and the terminal may include more or fewer components than those shown in the figure, or some components may be combined, or a different component deployment may be used.

An embodiment of this application further provides a computer device. The computer device includes a processor and a memory. The memory stores at least one instruction, at least one program, a code set, or an instruction set. The at least one instruction, the at least one program, the code set, or the instruction set is loaded and executed by the processor to implement the audio and video transcoding method provided in the foregoing method embodiments. In some embodiments, the computer device may be a terminal or a server.

An embodiment of this application further provides a non-transitory computer-readable storage medium, the computer-readable storage medium having at least one instruction, at least one segment of program, a code set, or an instruction set stored therein, the at least one instruction, the at least one segment of program, the code set, or the instruction set being loaded and executed by the processor to implement the audio and video transcoding method provided in the foregoing method embodiments.

An embodiment of this application further provides a computer program product or a computer program, the computer program product or the computer program including computer instructions, the computer instructions being stored in a computer-readable storage medium. A processor of a computer device reads the computer instructions from the computer-readable storage medium and executes the computer instructions, to cause the computer device to perform the audio and video transcoding method described in any one of the foregoing embodiments.

What is claimed is:

1. A method performed by a computer device, the method comprising:

obtaining first multimedia data in a first format;

processing the first multimedia data in the first format into intermediate data through a decoding operation in a first transcoding module;

processing the intermediate data into at least two pieces of second multimedia data in second formats through two distinct encoding operations in at least two second transcoding modules, the first transcoding module and the at least two second transcoding modules being configured to access the intermediate data stored in a data queue via a media bus that provides a data communication channel to the data queue, the at least two second transcoding modules further including a transcoding module A and a transcoding module B, wherein processing the intermediate data comprises:

obtaining, by the transcoding module A and the transcoding module B, the intermediate data, at a first position and a second position in the data queue, from the media bus, wherein the intermediate data includes audio data and video data and the second position is different from the first position, preprocessing, by the transcoding module A and the transcoding module B, the audio data in one preprocessing manner to obtain at least two pieces of preprocessed audio data, wherein each piece of the preprocessed audio data corresponds to a same audio format, preprocessing, by the transcoding module A and the transcoding module B, the video data in at least two preprocessing manners to obtain at least two pieces of preprocessed video data, wherein each piece of the preprocessed video data corresponds to a different video format, transmitting, by the transcoding module A and the transcoding module B, the at least two pieces of preprocessed audio data and the at least two pieces of preprocessed video data to the data queue via the media bus, and processing, by the transcoding module A and the transcoding module B, the at least two pieces of preprocessed audio data and the at least two pieces of preprocessed video data stored at different locations in the data queue via the media bus to obtain the at least two pieces of second multimedia data in the second formats, wherein the at least two pieces of second multimedia data have the same audio format and different video formats; and outputting a first piece of the at least two pieces of second multimedia data to a first terminal and a second piece of the at least two pieces of second multimedia data to a second terminal, wherein the first terminal is configured to play the first piece according to the audio format and a first video format and the second terminal is configured to play the second piece according to the audio format and a second video format.

2. The method according to claim 1, wherein before the processing the first multimedia data in the first format into intermediate data through a first transcoding operation, the method further comprises:

obtaining a configuration file, the configuration file comprising configuration information for indicating a processing operation provided for the first multimedia data.

3. The method according to claim 2, wherein the processing the first multimedia data in the first format into intermediate data through a first transcoding operation comprises:

processing the first multimedia data in the first format into the intermediate data through a decapsulation operation when the configuration information indicates to decapsulate the first multimedia data.

4. The method according to claim 2, wherein the processing the first multimedia data in the first format into intermediate data through a first transcoding operation comprises:

processing the first multimedia data in the first format into the intermediate data through a decoding operation when the configuration information indicates to decode the first multimedia data.

5. The method according to claim 2, wherein the processing the intermediate data into at least two pieces of second multimedia data in second formats through at least two second transcoding operations comprises:

encoding the intermediate data into the at least two pieces of second multimedia data in the second formats through encoding operations respectively corresponding to at least two encoding formats when the configuration information indicates to encode the intermediate data.

6. The method according to claim 2, wherein the processing the intermediate data into at least two pieces of second multimedia data in second formats through at least two second transcoding operations comprises:

encapsulating the intermediate data into the at least two pieces of second multimedia data in the second formats through an encapsulation operation when the configuration information indicates to encapsulate the intermediate data.

7. The method according to claim 1, wherein the preprocessing the audio data and the preprocessing the video data comprise at least one processing operation of: noise reduction, frame rate adjustment, scaling, sampling rate adjustment, sampling resolution adjustment, or volume adjustment.

8. A computer device, comprising a processor and a memory, the memory having at least one program stored therein, when loaded and executed by the processor, causing the computer device to implement an audio and video transcoding method including:

obtaining first multimedia data in a first format;

processing the first multimedia data in the first format into intermediate data through a decoding operation in a first transcoding module;

processing the intermediate data into at least two pieces of second multimedia data in second formats through two distinct encoding operations in at least two second transcoding modules, the first transcoding module and the at least two second transcoding modules being configured to access the intermediate data stored in a data queue via a media bus that provides a data communication channel to the data queue, the at least two second transcoding modules further including a transcoding module A and a transcoding module B, wherein processing the intermediate data comprises:

obtaining, by the transcoding module A and the transcoding module B, the intermediate data, at a first position and a second position in the data queue, from the media bus, wherein the intermediate data includes audio data and video data and the second position is different from the first position, preprocessing, by the transcoding module A and the transcoding module B, the audio data in one preprocessing manner to obtain at least two pieces of preprocessed audio data, wherein each piece of the preprocessed audio data corresponds to a same audio format, preprocessing, by the transcoding module A and the transcoding module B, the video data in at least two preprocessing manners to obtain at least two pieces of preprocessed video data, wherein each piece of the preprocessed video data corresponds to a different video format, transmitting, by the transcoding module A and the transcoding module B, the at least two pieces of preprocessed audio data and the at least two pieces of preprocessed video data to the data queue via the media bus, and processing, by the transcoding module A and the transcoding module B, the at least two pieces of preprocessed audio data and the at least two pieces of preprocessed video data stored at different locations in the data queue via the media bus to obtain the at least two pieces of second multimedia data in the second formats, wherein the at least two pieces of second multimedia data have the same audio format and different video formats; and outputting a first piece of the at least two pieces of second multimedia data to a first terminal and a second piece of the at least two pieces of second multimedia data to a second terminal, wherein the first terminal is configured to play the first piece according to the audio format and a first video format and the second terminal is configured to play the second piece according to the audio format and a second video format.

9. The computer device according to claim 8, wherein before the processing the first multimedia data in the first format into intermediate data through a first transcoding operation, the method further comprises:

obtaining a configuration file, the configuration file comprising configuration information for indicating a processing operation provided for the first multimedia data.

10. The computer device according to claim 9, wherein the processing the first multimedia data in the first format into intermediate data through a first transcoding operation comprises:

processing the first multimedia data in the first format into the intermediate data through a decapsulation operation when the configuration information indicates to decapsulate the first multimedia data.

11. The computer device according to claim 9, wherein the processing the first multimedia data in the first format into intermediate data through a first transcoding operation comprises:

processing the first multimedia data in the first format into the intermediate data through a decoding operation when the configuration information indicates to decode the first multimedia data.

12. The computer device according to claim 9, wherein the processing the intermediate data into at least two pieces of second multimedia data in second formats through at least two second transcoding operations comprises:

encoding the intermediate data into the at least two pieces of second multimedia data in the second formats through encoding operations respectively corresponding to at least two encoding formats when the configuration information indicates to encode the intermediate data.

13. The computer device according to claim 9, wherein the processing the intermediate data into at least two pieces of second multimedia data in second formats through at least two second transcoding operations comprises:

encapsulating the intermediate data into the at least two pieces of second multimedia data in the second formats through an encapsulation operation when the configuration information indicates to encapsulate the intermediate data.

14. The computer device according to claim 8, wherein the preprocessing the audio data and the preprocessing the video data comprise at least one processing operation of: noise reduction, frame rate adjustment, scaling, sampling rate adjustment, sampling resolution adjustment, or volume adjustment.

15. A non-transitory computer-readable storage medium, having at least one segment of program code stored therein, when loaded and executed by a processor of a computer device, causing the computer device to implement an audio and video transcoding method including:

obtaining first multimedia data in a first format;

processing the first multimedia data in the first format into intermediate data through a decoding operation in a first transcoding module;

processing the intermediate data into at least two pieces of second multimedia data in second formats through two distinct encoding operations in at least two second transcoding modules, the first transcoding module and the at least two second transcoding modules being configured to access the intermediate data stored in a data queue via a media bus that provides a data communication channel to the data queue, the at least two second transcoding modules further including a transcoding module A and a transcoding module B, wherein processing the intermediate data comprises:

obtaining, by the transcoding module A and the transcoding module B, the intermediate data, at a first position and a second position in the data queue, from the media bus, wherein the intermediate data includes audio data and video data and the second position is different from the first position, preprocessing, by the transcoding module A and the transcoding module B, the audio data in one preprocessing manner to obtain at least two pieces of preprocessed audio data, wherein each piece of the preprocessed audio data corresponds to a same audio format, preprocessing, by the transcoding module A and the transcoding module B, the video data in at least two preprocessing manners to obtain at least two pieces of preprocessed video data, wherein each piece of the preprocessed video data corresponds to a different video format, transmitting, by the transcoding module A and the transcoding module B, the at least two pieces of preprocessed audio data and the at least two pieces of preprocessed video data to the data queue via the media bus, and processing, by the transcoding module A and the transcoding module B, the at least two pieces of preprocessed audio data and the at least two pieces of preprocessed video data stored at different locations in the data queue via the media bus to obtain the at least two pieces of second multimedia data in the second formats, wherein the at least two pieces of second multimedia data have the same audio format and different video formats; and outputting a first piece of the at least two pieces of second multimedia data to a first terminal and a second piece of the at least two pieces of second multimedia data to a second terminal, wherein the first terminal is configured to play the first piece according to the audio format and a first video format and the second terminal is configured to play the second piece according to the audio format and a second video format.

16. The non-transitory computer-readable storage medium according to claim 15, wherein before the processing the first multimedia data in the first format into intermediate data through a first transcoding operation, the method further comprises:

obtaining a configuration file, the configuration file comprising configuration information for indicating a processing operation provided for the first multimedia data.

17. The non-transitory computer-readable storage medium according to claim 16, wherein the processing the first multimedia data in the first format into intermediate data through a first transcoding operation comprises:

processing the first multimedia data in the first format into the intermediate data through a decapsulation operation when the configuration information indicates to decapsulate the first multimedia data.

18. The non-transitory computer-readable storage medium according to claim 16, wherein the processing the first multimedia data in the first format into intermediate data through a first transcoding operation comprises:

processing the first multimedia data in the first format into the intermediate data through a decoding operation when the configuration information indicates to decode the first multimedia data.

19. The non-transitory computer-readable storage medium according to claim 16, wherein the processing the intermediate data into at least two pieces of second multimedia data in second formats through at least two second transcoding operations comprises:

encoding the intermediate data into the at least two pieces of second multimedia data in the second formats through encoding operations respectively corresponding to at least two encoding formats when the configuration information indicates to encode the intermediate data.

20. The non-transitory computer-readable storage medium according to claim 15, wherein the preprocessing the audio data and the preprocessing the video data comprise at least one processing operation of: noise reduction, frame rate adjustment, scaling, sampling rate adjustment, sampling resolution adjustment, or volume adjustment.

* * * * *